(12) United States Patent
Visco et al.

(10) Patent No.: US 9,660,265 B2
(45) Date of Patent: May 23, 2017

(54) LITHIUM SULFUR BATTERIES AND ELECTROLYTES AND SULFUR CATHODES THEREOF

(71) Applicant: PolyPlus Battery Company, Berkeley, CA (US)

(72) Inventors: Steven J. Visco, Berkeley, CA (US); Nikolay Goncharenko, Walnut Creek, CA (US); Vitaliy Nimon, San Francisco, CA (US); Alexei Petrov, Walnut Creek, CA (US); Yevgeniy S. Nimon, Danville, CA (US); Lutgard C. De Jonghe, Lafayette, CA (US); Bruce D. Katz, Moraga, CA (US); Valentina Loginova, Walnut Creek, CA (US)

(73) Assignee: POLYPLUS BATTERY COMPANY, Berkeley, CA (US)

( * ) Notice: Subject to any disclaimer, the term of this patent is extended or adjusted under 35 U.S.C. 154(b) by 293 days.

(21) Appl. No.: 14/657,695

(22) Filed: Mar. 13, 2015

(65) Prior Publication Data
US 2015/0214555 A1 Jul. 30, 2015

Related U.S. Application Data

(63) Continuation-in-part of application No. 14/334,573, filed on Jul. 17, 2014, now abandoned, which is a
(Continued)

(51) Int. Cl.
*H01M 4/58* (2010.01)
*H01M 4/38* (2006.01)
(Continued)

(52) U.S. Cl.
CPC ........... *H01M 4/5815* (2013.01); *H01M 4/38* (2013.01); *H01M 10/36* (2013.01); *H01M 2/40* (2013.01);
(Continued)

(58) Field of Classification Search
None
See application file for complete search history.

(56) References Cited

U.S. PATENT DOCUMENTS

| 3,248,265 A | 4/1966 | Herbert |
| 3,528,856 A | 9/1970 | Ovshinsky |
(Continued)

FOREIGN PATENT DOCUMENTS

| CN | 101479911 | 7/2009 |
| CN | 101702444 | 5/2010 |
(Continued)

OTHER PUBLICATIONS

International Search Report and Written Opinion dated Oct. 18, 2005 from International Application No. PCT/US2004/033372.
(Continued)

*Primary Examiner* — Scott J Chmielecki
(74) *Attorney, Agent, or Firm* — Weaver Austin Villeneuve & Sampson LLP

(57) ABSTRACT

Lithium sulfur battery cells that use water as an electrolyte solvent provide significant cost reductions. Electrolytes for the battery cells may include water solvent for maintaining electroactive sulfur species in solution during cell discharge and a sufficient amount of a cycle life-enhancing compound that facilitates charging at the cathode. The combination of these two components enhances one or more of the following cell attributes: energy density, power density and cycle life. For instance, in applications where cost per Watt-Hour (Wh) is paramount, such as grid storage and traction applications, the use of an aqueous electrolyte in combination with inexpensive sulfur as the cathode active material can be a key enabler for the utility and automotive industries, for example, providing a cost effective and compact solution for load leveling, electric vehicles and renewable energy storage. Sulfur cathodes, and methods of fabricating lithium
(Continued)

sulfur cells, in particular for loading lithium sulfide into the cathode structures, provide further advantages.

20 Claims, 7 Drawing Sheets

Related U.S. Application Data continuation of application No. 13/676,487, filed on Nov. 14, 2012, now Pat. No. 8,828,575, which is a continuation-in-part of application No. 13/475,324, filed on May 18, 2012, now Pat. No. 8,828,574, which is a continuation-in-part of application No. 13/440,847, filed on Apr. 5, 2012, now Pat. No. 8,828,573.

(60) Provisional application No. 61/993,609, filed on May 15, 2014, provisional application No. 61/955,101, filed on Mar. 18, 2014, provisional application No. 61/585,589, filed on Jan. 11, 2012, provisional application No. 61/560,134, filed on Nov. 15, 2011, provisional application No. 61/623,031, filed on Apr. 11, 2012.

(51) Int. Cl.
*H01M 10/36* (2010.01)
*H01M 2/40* (2006.01)
*H01M 4/40* (2006.01)
*H01M 4/485* (2010.01)
*H01M 4/587* (2010.01)
*H01M 4/66* (2006.01)
*H01M 4/74* (2006.01)
*H01M 4/80* (2006.01)

(52) U.S. Cl.
CPC ............ *H01M 4/382* (2013.01); *H01M 4/386* (2013.01); *H01M 4/405* (2013.01); *H01M 4/485* (2013.01); *H01M 4/587* (2013.01); *H01M 4/661* (2013.01); *H01M 4/663* (2013.01); *H01M 4/667* (2013.01); *H01M 4/74* (2013.01); *H01M 4/806* (2013.01); *H01M 4/808* (2013.01); *H01M 2300/0002* (2013.01); *H01M 2300/0014* (2013.01); *H01M 2300/0037* (2013.01)

(56) References Cited

U.S. PATENT DOCUMENTS

| | | | |
|---|---|---|---|
| 3,607,417 A | 9/1971 | McRae et al. | |
| 3,615,835 A | 10/1971 | Ovshinsky | |
| 3,625,769 A | 12/1971 | Lyall | |
| 3,679,540 A | 7/1972 | Zimmerman et al. | |
| 3,703,415 A | 11/1972 | Mitoff et al. | |
| 3,912,536 A | 10/1975 | Galli et al. | |
| 3,953,566 A | 4/1976 | Gore | |
| 3,976,509 A | 8/1976 | Tsai et al. | |
| 4,007,057 A | 2/1977 | Littauer et al. | |
| 4,091,182 A | 5/1978 | Farrington et al. | |
| 4,100,238 A | 7/1978 | Shinomura | |
| 4,162,202 A | 7/1979 | Dey | |
| 4,163,084 A | 7/1979 | Tsai et al. | |
| 4,187,390 A | 2/1980 | Gore | |
| 4,210,707 A | 7/1980 | Farrington | |
| 4,385,101 A | 5/1983 | Catanzarite | |
| 4,402,995 A | 9/1983 | Fleischer | |
| 4,405,416 A | 9/1983 | Raistrick et al. | |
| 4,414,293 A | 11/1983 | Joy et al. | |
| 4,429,000 A | 1/1984 | Naka et al. | |
| 4,504,561 A | 3/1985 | Winsel | |
| 4,539,256 A | 9/1985 | Shipman | |
| 4,726,989 A | 2/1988 | Mrozinski | |
| 4,828,942 A | 5/1989 | Licht | |
| 4,833,048 A | 5/1989 | De Jonghe et al. | |
| 4,916,036 A | 4/1990 | Cheiky | |
| 4,917,974 A | 4/1990 | Visco et al. | |
| 4,981,672 A | 1/1991 | De Neufville et al. | |
| 4,985,317 A | 1/1991 | Adachi et al. | |
| 5,002,843 A | 3/1991 | Cieslak et al. | |
| 5,035,963 A | 7/1991 | Plichta | |
| 5,100,523 A | 3/1992 | Helms et al. | |
| 5,108,856 A | 4/1992 | Shuster | |
| 5,162,172 A | 11/1992 | Kaun | |
| 5,162,175 A | 11/1992 | De Jonghe et al. | |
| 5,166,011 A | 11/1992 | Rao et al. | |
| 5,198,081 A | 3/1993 | Kanoh et al. | |
| 5,213,908 A | 5/1993 | Hagedorn | |
| 5,290,592 A | 3/1994 | Izuchi et al. | |
| 5,314,765 A | 5/1994 | Bates | |
| 5,336,384 A | 8/1994 | Tsou et al. | |
| 5,338,625 A | 8/1994 | Bates et al. | |
| 5,342,710 A | 8/1994 | Koksbang | |
| 5,387,479 A | 2/1995 | Koksbang | |
| 5,409,786 A | 4/1995 | Bailey | |
| 5,413,881 A * | 5/1995 | Licht | H01M 4/581 429/103 |
| 5,427,873 A | 6/1995 | Shuster | |
| 5,455,126 A | 10/1995 | Bates et al. | |
| 5,506,068 A | 4/1996 | Dan et al. | |
| 5,510,209 A | 4/1996 | Abraham et al. | |
| 5,512,147 A | 4/1996 | Bates et al. | |
| 5,516,598 A | 5/1996 | Chu et al. | |
| 5,523,179 A | 6/1996 | Chu | |
| 5,525,442 A | 6/1996 | Shuster | |
| 5,532,077 A | 7/1996 | Chu | |
| 5,567,210 A | 10/1996 | Bates et al. | |
| 5,569,520 A | 10/1996 | Bates | |
| 5,571,600 A | 11/1996 | Licht | |
| 5,582,623 A | 12/1996 | Chu | |
| 5,597,660 A | 1/1997 | Bates et al. | |
| 5,612,152 A | 3/1997 | Bates | |
| 5,648,183 A | 7/1997 | Licht et al. | |
| 5,648,187 A | 7/1997 | Skotheim | |
| 5,652,068 A | 7/1997 | Shuster et al. | |
| 5,665,481 A | 9/1997 | Shuster et al. | |
| 5,686,201 A | 11/1997 | Chu | |
| 5,693,212 A | 12/1997 | Mazanec et al. | |
| 5,696,201 A | 12/1997 | Cavalloni et al. | |
| 5,702,995 A | 12/1997 | Fu | |
| 5,789,108 A | 8/1998 | Chu | |
| 5,814,420 A | 9/1998 | Chu | |
| 5,882,812 A | 3/1999 | De Jonghe et al. | |
| 5,961,672 A | 10/1999 | Skotheim et al. | |
| 5,962,171 A | 10/1999 | Boguslavsky et al. | |
| 6,017,651 A | 1/2000 | Chu et al. | |
| 6,025,094 A | 2/2000 | Visco et al. | |
| 6,025,095 A | 2/2000 | Kawamura | |
| 6,030,720 A | 2/2000 | Chu et al. | |
| 6,030,909 A | 2/2000 | Fu | |
| 6,066,417 A | 5/2000 | Cho et al. | |
| 6,068,950 A | 5/2000 | Gan et al. | |
| 6,096,447 A | 8/2000 | Gan et al. | |
| 6,110,236 A | 8/2000 | Chu et al. | |
| 6,146,787 A | 11/2000 | Harrup et al. | |
| 6,165,644 A | 12/2000 | Chu et al. | |
| 6,183,901 B1 | 2/2001 | Ying et al. | |
| 6,198,701 B1 | 3/2001 | De Jonghe et al. | |
| 6,200,701 B1 | 3/2001 | Gan et al. | |
| 6,200,704 B1 | 3/2001 | De Jonghe et al. | |
| 6,203,942 B1 | 3/2001 | Gan et al. | |
| 6,203,947 B1 | 3/2001 | Peled et al. | |
| 6,207,324 B1 | 3/2001 | Licht | |
| 6,210,832 B1 | 4/2001 | Chu et al. | |
| 6,214,061 B1 | 4/2001 | Visco et al. | |
| 6,225,002 B1 | 5/2001 | Chu et al. | |
| 6,228,527 B1 | 5/2001 | Medeiros et al. | |
| 6,242,135 B1 | 6/2001 | Mushiake | |
| 6,248,481 B1 | 6/2001 | Visco et al. | |
| 6,274,269 B1 | 8/2001 | Gan et al. | |
| 6,280,598 B1 | 8/2001 | Barton et al. | |
| 6,296,958 B1 | 10/2001 | Pinto et al. | |

(56) References Cited

U.S. PATENT DOCUMENTS

| | | |
|---|---|---|
| 6,315,881 B1 | 11/2001 | Fu |
| 6,344,293 B1 | 2/2002 | Geronov |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,733,924 B1 | 5/2004 | Skotheim et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,771,870 B2 | 8/2010 | Affinito et al. |
| 7,781,108 B2 | 8/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 7,998,626 B2 | 8/2011 | Visco et al. |
| 8,048,571 B2 | 11/2011 | Visco et al. |
| 8,114,171 B2 | 2/2012 | Visco et al. |
| 8,182,943 B2 | 5/2012 | Visco et al. |
| 8,202,649 B2 | 6/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,501,351 B2 | 8/2013 | Phillips et al. |
| 8,652,686 B2 | 2/2014 | Visco et al. |
| 8,652,692 B2 | 2/2014 | Visco et al. |
| 8,709,679 B2 | 4/2014 | Visco et al. |
| 8,828,573 B2 | 9/2014 | Visco et al. |
| 8,828,574 B2 | 9/2014 | Visco et al. |
| 8,828,575 B2 | 9/2014 | Visco et al. |
| 8,828,580 B2 | 9/2014 | Visco et al. |
| 2001/0014420 A1 | 8/2001 | Takeuchi et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0015869 A1 | 2/2002 | Suda |
| 2002/0028389 A1 | 3/2002 | Sonoda et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2003/0124433 A1 | 7/2003 | Kim et al. |
| 2003/0190501 A1 | 10/2003 | Rendina |
| 2003/0224234 A1 | 12/2003 | Steele et al. |
| 2004/0081894 A1 | 4/2004 | Nimon |
| 2004/0101761 A1 | 5/2004 | Park et al. |
| 2004/0126653 A1 | 7/2004 | Visco et al. |
| 2004/0142244 A1 | 7/2004 | Visco et al. |
| 2004/0185334 A1 | 9/2004 | Imamoto |
| 2004/0191617 A1 | 9/2004 | Visco et al. |
| 2004/0197641 A1 | 10/2004 | Visco et al. |
| 2005/0095506 A1 | 5/2005 | Klaassen |
| 2005/0100792 A1 | 5/2005 | Visco et al. |
| 2005/0100793 A1 | 5/2005 | Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0046149 A1 | 3/2006 | Yong et al. |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2006/0194115 A1 | 8/2006 | De Jonghe et al. |
| 2006/0208701 A1 | 9/2006 | Mikhaylik |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0148533 A1 | 6/2007 | Anglin et al. |
| 2007/0172739 A1* | 7/2007 | Visco .................. H01B 1/122 429/322 |
| 2007/0231704 A1 | 10/2007 | Inda |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2009/0286114 A1 | 11/2009 | Visco et al. |
| 2009/0297935 A1 | 12/2009 | Visco et al. |
| 2010/0104934 A1 | 4/2010 | Visco et al. |
| 2010/0203383 A1 | 8/2010 | Weppner |
| 2010/0273067 A1 | 10/2010 | Visco et al. |
| 2011/0014522 A1 | 1/2011 | Visco et al. |
| 2011/0039144 A1 | 2/2011 | Visco et al. |
| 2011/0053002 A1 | 3/2011 | Yamamura et al. |
| 2011/0244337 A1 | 10/2011 | Ohta et al. |
| 2011/0269031 A1 | 11/2011 | Visco et al. |
| 2011/0318648 A1 | 12/2011 | Eitouni et al. |
| 2012/0009469 A1 | 1/2012 | Visco et al. |
| 2012/0094188 A1 | 4/2012 | Visco et al. |
| 2012/0169016 A1 | 7/2012 | Hisano et al. |
| 2012/0219842 A1 | 8/2012 | Visco et al. |
| 2012/0270112 A1 | 10/2012 | Visco et al. |
| 2013/0066025 A1 | 3/2013 | Yang et al. |
| 2013/0122344 A1 | 5/2013 | Visco et al. |
| 2013/0141050 A1 | 6/2013 | Visco et al. |
| 2013/0273419 A1 | 10/2013 | Pistorino et al. |
| 2014/0004447 A1 | 1/2014 | Visco et al. |
| 2014/0057153 A1 | 2/2014 | Visco et al. |
| 2014/0170465 A1 | 6/2014 | Visco et al. |
| 2014/0322584 A1 | 10/2014 | Visco et al. |
| 2015/0024251 A1 | 1/2015 | Visco et al. |

FOREIGN PATENT DOCUMENTS

| | | |
|---|---|---|
| EP | 0111213 | 11/1983 |
| EP | 0111214 | 11/1983 |
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1699104 | 9/2006 |
| EP | 1892780 | 2/2008 |
| JP | 55-081471 | 6/1980 |
| JP | 57-003371 | 1/1982 |
| JP | 57-017568 | 1/1982 |
| JP | 57-103271 | 6/1982 |
| JP | 62-243247 | 10/1987 |
| JP | 63-198261 | 8/1988 |
| JP | 04-275387 | 9/1992 |
| JP | 05-234578 | 9/1993 |
| JP | 09-320645 | 12/1997 |

(56) References Cited

FOREIGN PATENT DOCUMENTS

| | | |
|---|---|---|
| JP | 2001-351615 | 12/2001 |
| JP | 2002-513991 | 5/2002 |
| JP | 2002-518796 | 6/2002 |
| JP | 2002-528866 | 9/2002 |
| JP | 2002-289266 | 10/2002 |
| JP | 2003-217662 | 7/2003 |
| JP | 2003-346862 | 12/2003 |
| JP | 2004-504933 | 2/2004 |
| JP | 2005-503920 | 2/2005 |
| KR | 10/2001-0024927 | 3/2001 |
| KR | 2001-0043145 | 5/2001 |
| KR | 10-2002-0059419 | 7/2002 |
| WO | 98/28811 | 7/1998 |
| WO | 99/43034 | 8/1999 |
| WO | 99/57770 | 11/1999 |
| WO | 99/65101 | 12/1999 |
| WO | 00/51198 | 8/2000 |
| WO | 01/33651 | 5/2001 |
| WO | 01/39302 | 5/2001 |
| WO | 02/50933 | 6/2002 |
| WO | 02/095849 | 11/2002 |
| WO | 2004/036669 | 4/2004 |
| WO | 2005/038953 | 4/2005 |
| WO | 2005/038962 | 4/2005 |
| WO | 2006/088861 | 8/2006 |
| WO | 2013/074772 | 5/2013 |

OTHER PUBLICATIONS

U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 11/245,472, Office Action mailed Aug. 23, 2007.
U.S. Appl. No. 11/245,472, Office Action mailed Apr. 16, 2008.
U.S. Appl. No. 10/986,441, Office Action mailed Oct. 20, 2008.
U.S. Appl. No. 11/823,847, Office Action mailed Sep. 16, 2008.
U.S. Appl. No. 12/649,245, Office Action mailed Mar. 31, 2010.
U.S. Appl. No. 10/825,587, Notice of Allowance mailed Nov. 24, 2008.
U.S. Appl. No. 10/772,228, Notice of Allowance mailed Jan. 22, 2008.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.

Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in Li2O—Al2O3—TiO2—SiO2—P2O5 Glass-Ceramics", Journal of the American Ceramics Society, vol. 80, No. 7, Jul. 1997, pp. 1-5.
Aono et al., "Ionic Conductivity of the Lithium Titanium Phosphate ($Li_{1+x}M_xTi_{2-x(PO4)3}$, M=Al, Sc, Y, and La) Systems", Dept. of Industrial Chemistry, pp. 590-591, Aug. 19, 1988.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta=Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O$—$Al_2O_3$—$TiO_3$—$P_2O_5$", Solid State Ionics, 96 (1997), pp. 195-200.
Fu, Jie, "Fast Li+ ion conducting glass-ceramics in the system $Li_2O$—$Al_2O_3$—$GeO_2$—$P_2O_5$" Solid State Ionics 104 (1997), pp. 191-194.
Aono, et al., "DC Conductivity of $Li_{1.3}Al_{0.3}Ti_{1.7}(PO_4)_3$ Ceramic with Li Electrodes", Chemistry Letters, 1991, pp. 1567-1570.
Aono, et al., "Electrical Properties of Sintered Lithium Titanium Phosphate Ceramics ($Li_{1+x}M_xTi_{2-x}PO_4)_3$,$M^{3+}=Al^{3+},Sc^{3+}$, or $Y^{3+}$)", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of The Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.

(56) References Cited

OTHER PUBLICATIONS

Zhang et al., "Electrochemical Lithium Intercalation in VO$_2$(B) in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., RAPP, 4$^{th}$ vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
WO patent application No. PCT/US06/45407, International Search Report and Written Opinion, mailed Aug. 30, 2007.
CN patent application No. 200480037293.5, Office Action mailed Aug. 22, 2008.
EP patent application No. 04794699.1, Examination Report mailed Aug. 5, 2008.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
CN patent application No. 200480042697.3, Office Action mailed Dec. 19, 2008.
Thokchom, Joykumar S., et al., Water Durable Lithium Ion Conducting Composite Membranes from the Li$_2$O—Al$_2$O$_3$—TiO$_2$—P$_2$O$_5$ Glass-Ceramic, *Journal of The Electrochemical Society*, 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
U.S. Appl. No. 11/823,847, Office Action mailed Apr. 28, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
U.S. Appl. No. 10/986,441, Notice of Allowance mailed Jun. 19, 2009.
U.S. Appl. No. 10/772,157, Notice of Allowance mailed Sep. 17, 2009.
International patent application No. PCT/US06/48755, International Search Report mailed Apr. 7, 2008.
International patent application No. PCT/US06/48755, Written Opinion mailed Apr. 7, 2008.
Ogasawara T. et al., "Rechargeable Li$_2$O$_2$ Electrode for Lithium Batteries", J. Am. Chem. Soc. 128(4), 2006, pp. 1390-1393.
Foster D.L. et al., "Ceramic Membranes for Lithium Batteries", Proceeding of the 42$^{nd}$ Power Sources Conference, Jun. 2006, p. 2.14.
Read J., "Electrolyte Formulation and Temperature Performance of the Li/O$_2$ Battery", Proceeding of the 9$^{th}$ Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 24, 2009.
U.S. Appl. No. 11/824,548, Notice of Allowance mailed Dec. 17, 2009.
U.S. Appl. No. 11/245,472, Office Action mailed Feb. 4, 2010.
U.S. Appl. No. 12/475,403, Office Action mailed Feb. 8, 2010.
AU patent application No. 2003301383, Notice of Acceptance mailed Nov. 26, 2009.
CN patent application No. 200480037293.5, Office Action mailed Jan. 29, 2010.
EP patent application No. 04794655.3, Examination Report mailed Apr. 22, 2010.
CA patent application No. 2,502,438, Examination Report mailed May 12, 2010.
U.S. Appl. No. 11/562,883, Office Action mailed Jun. 7, 2010.
AU patent application No. 2006280097, Examination Report mailed Jun. 9, 2010.
JP patent application No. 2004-545584, Notification of reason for rejection mailed Jun. 8, 2010.
U.S. Appl. No. 12/475,403, Office Action mailed Jun. 22, 2010.
U.S. Appl. No. 11/824,579, Office Action mailed Jun. 25, 2010.
CN patent application No. 200480037293.5, Office Action mailed Jun. 24, 2010.
AU patent application No. 2004306866, Notice of Acceptance mailed Jun. 17, 2010.
U.S. Appl. No. 12/649,245, Office Action mailed Jul. 19, 2010.
U.S. Appl. No. 12/831,066, Office Action mailed Aug. 18, 2010.
U.S. Appl. No. 11/824,597, Notice of Allowance mailed Sep. 9, 2010.
KR patent application No. 10-2005-7006382, Office Action mailed Aug. 31, 2010.
U.S. Appl. No. 12/475,403, Notice of Allowance mailed Oct. 7, 2010.
Thangadurai, Venkataraman et al., "Novel fast lithium ion conduction in garnet-type Li$_5$La$_3$M$_2$O$_{12}$ (M=Nb, Ta)", J. Am. Chem. Soc. 86 (3) 437-40 (2003), Oct. 21, 2002.
U.S. Appl. No. 12/649,245, Office Action mailed Nov. 30, 2010.
U.S. Appl. No. 11/612,741, Office Action mailed Nov. 29, 2010.
U.S. Appl. No. 11/562,883, Office Action mailed Jan. 19, 2011.
U.S. Appl. No. 12/831,066, Office Action mailed Jan. 19, 2011.
CA patent application No. 2,542,304, Examination Report mailed Apr. 4, 2011.
U.S. Appl. No. 12/831,066, Notice of Allowance mailed Apr. 6, 2011.
U.S. Appl. No. 12/907,819, Office Action mailed May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report mailed May 10, 2011.

(56) References Cited

OTHER PUBLICATIONS

KR patent application No. 10-2006-7017692, Notice to Submit Response mailed May 13, 2011.
JP patent application No. 2006-535572, Office Action mailed Jun. 21, 2011.
JP patent application No. 2006-552102, Office Action mailed Jul. 5, 2011.
U.S. Appl. No. 11/612,741, Office Action mailed Jul. 22, 2011.
U.S. Appl. No. 12/649,245, Notice of Allowance mailed Sep. 14, 2011.
KR patent application No. 2006-7007309, Office Action mailed Jul. 27, 2011.
KR patent application No. 2005-7006382, Office Action mailed Aug. 10, 2011.
U.S. Appl. No. 12/907,819, Notice of Allowance mailed Nov. 10, 2011.
U.S. Appl. No. 13/236,428, Office Action mailed Nov. 16, 2011.
CN patent application No. 200910174918.7, Office Action mailed Oct. 19, 2011.
U.S. Appl. No. 11/612,741, Notice of Allowance mailed Feb. 3, 2012.
CA patent application No. 2,542,304, Exam Report mailed Apr. 3, 2012.
KR patent application No. 9-5-2012-016417008, Office Action mailed Mar. 21, 2012.
U.S. Appl. No. 13/236,428, Notice of Allowance mailed Apr. 25, 2012.
U.S. Appl. No. 12/888,154, Office Action mailed May 3, 2012.
KR patent application No. 10-2005-7006382, Office Action mailed Mar. 31, 2012.
U.S. Appl. No. 13/336,459, Office Action mailed Jun. 7, 2012.
U.S. Appl. No. 13/182,322, Office Action mailed Jul. 5, 2012.
EP patent application No. 03809186.4, Exam Report mailed Jun. 21, 2012.
U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 13/464,835, Office Action mailed Sep. 25, 2012.
U.S. Appl. No. 13/182,322, Notice of Allowance mailed Sep. 19, 2012.
JP patent application No. 2006-552102, Office Action mailed Sep. 25, 2012.
KR patent application No. 10-2005-7006382, Notice to Submit Response mailed Oct. 30, 2012.
KR patent application No. 9-5-2012-016417008, Notice of Allowance mailed Nov. 23, 2012.
Licht et al., "A solid sulfur cathode for aqueous batteries," *Science*, vol. 261, No. 5124 (Aug. 20, 1993) 1029-1032.
Licht et al., "Investigation of a novel aqueous aluminum/sulfur battery," *Journal of Power Sources*, 45 (1993) 311-323.
U.S. Appl. No. 13/673,789, Office Action mailed Feb. 28, 2013.
U.S. Appl. No. 13/615,351, Office Action mailed Mar. 25, 2013.
CA patent application No. 2,542,304, Office Action mailed Jan. 30, 2013.
U.S. Appl. No. 13/464,835, Office Action mailed May 2, 2013.
U.S. Appl. No. 13/615,351, Notice of Allowance mailed May 31, 2013.
U.S. Appl. No. 11/562,883, Office Action mailed Jun. 10, 2013.
U.S. Appl. No. 13/708,540, Office Action mailed Jun. 17, 2013.
U.S. Appl. No. 13/464,835, Office Action mailed Aug. 29, 2013.
Choi et al., "Challenges facing lithium batteries and electrical double-layer capacitors," www.angewandte.org Angew. Chem. Int. Ed. 2012, 51, 9994-10024 (31 pages).
Freunberger et al., "Reactions in the rechargeable lithium-$O_2$ battery with alkyl carbonate electrolytes," ACS Publications, J. Am. Chem. Soc. 2011, 133, 8040-8047 (8 pages).
Freunberger et al., "The lithium-oxygen battery with ether-based electrolytes," Wiley Online Library, Angew. Chem. Int. Ed. 2011, 50, 1-6 (6 pages).
CA patent application No. 2,542,304, Notice of Allowance mailed Aug. 18, 2013.
TW patent application No. 097122683, Office Action mailed Aug. 13, 2013.
U.S. Appl. No. 13/673,789, Notice of Allowance mailed Oct. 1, 2013.
U.S. Appl. No. 13/708,540, Office Action mailed Oct. 16, 2013.
U.S. Appl. No. 11/562,883, Notice of Allowance mailed Oct. 17, 2013.
JP patent application No. 2006-552102, Office Action mailed Nov. 26, 2013.
KR patent application No. 2013-078956319, Notice to Submit Response mailed Nov. 18, 2013.
U.S. Appl. No. 13/464,835, Office Action mailed Jan. 16, 2014.
Linden and T.B. Reddy, *Handbook of Batteries*, McGraw-Hill, NY $3^{rd}$ Edition, 2002, p. 38.5.
U.S. Appl. No. 13/717,255, Notice of Allowance mailed Jan. 30, 2014.
WO2009/003695, machine English translation.
WO2013/010692, machine English translation.
BR patent application No. PI0415312.0, Search and Exam Report mailed Mar. 6, 2014.
U.S. Appl. No. 13/708,540, Office Action mailed Apr. 17, 2014.
U.S. Appl. No. 13/708,540, Notice of Allowance mailed May 23, 2014.
U.S. Appl. No. 14/292,699, "Protected lithium electrodes based on ceramic membranes," Visco et al., filed May 30, 2014.
U.S. Appl. No. 13/464,835, Office Action mailed Jun. 3, 2014.
U.S. Appl. No. 13/929,653, Notice of Allowance mailed Jun. 9, 2014.
KR patent application No. 10-2013-7020727, Office Action mailed May 22, 2014.
JP patent application No. 2006-552102, Office Action mailed Jul. 8, 2014.
JP patent application No. 2006-552102, Decision to Grant mailed Aug. 25, 2014.
U.S. Appl. No. 14/449,040, "Protected active metal electrode and battery cell structures with non-aqueous interlayer architecture," Visco et al., filed Jul. 31, 2014.
U.S. Appl. No. 13/464,835, Office Action mailed Jan. 8, 2015.
U.S. Appl. No. 13/440,847, Notice of Allowance mailed Jun. 24, 2014.
U.S. Appl. No. 13/475,324, Notice of Allowance mailed Jul. 7, 2014.
U.S. Appl. No. 13/676,487, Notice of Allowance mailed Jun. 12, 2014.
U.S. Appl. No. 14/334,573, "Aqueous electrolyte lithium sulfur batteries," Steven J. Visco et al., filed Jul. 17, 2014.
WO patent application No. PCT/US2012/065251, International Search Report and Written Opinion mailed Mar. 28, 2013.
CA patent application No. 2,854,355, Examination Report mailed Aug. 25, 2014.
CA patent application No. 2,854,355, Office Action mailed Mar. 5, 2015.
EP patent application No. 12850015.4, European Search Report mailed Jun. 8, 2015.
Lee, Yong Min et al., "Electrochemical performance of lithium/ sulfur batteries with protected Li anodes," Journal of Power Sources 119-121 (2003) 964-972.
U.S. Appl. No. 14/334,573, Office Action mailed Sep. 11, 2015.
CN patent application No. 201280066987.6, Office Action mailed Jan. 12, 2016.

\* cited by examiner

Illustration of solubility level of Li$_2$S (final discharge product in Li-S cell)

3 mol/L of Li$_2$S in non-aqueous solvent (glyme) Extremely low solubility (≤1x10$^{-3}$ mole/L)

3 mol/L of Li$_2$S in water completely dissolved

510A

510B

510C

510D

LITHIUM SULFUR BATTERIES AND ELECTROLYTES AND SULFUR CATHODES THEREOF

CROSS-REFERENCE TO RELATED APPLICATIONS

This application claims priority to U.S. Provisional Patent Application No. 61/955,101 filed Mar. 18, 2014, titled ELECTROLYTES AND SULFUR CATHODES FOR AQUEOUS LITHIUM SULFUR BATTERIES, and to U.S. Provisional Patent Application No. 61/993,609, filed May 15, 2014, titled ELECTROLYTES AND SULFUR CATHODES FOR AQUEOUS LITHIUM SULFUR BATTERIES.

This application is a continuation-in-part of U.S. patent application Ser. No. 14/334,573, filed Jul. 17, 2014, titled AQUEOUS ELECTROLYTE LITHIUM SULFUR BATTERIES, which is a continuation of U.S. patent application Ser. No. 13/676,487, filed Nov. 14, 2012, titled AQUEOUS ELECTROLYTE LITHIUM SULFUR BATTERIES; which is a continuation-in-part part of U.S. patent application Ser. No. 13/475,324, filed May 18, 2012, titled AQUEOUS ELECTROLYTE LITHIUM SULFUR BATTERIES; which is a continuation-in-part of U.S. patent application Ser. No. 13/440,847, filed Apr. 5, 2012, titled AQUEOUS ELECTROLYTE LITHIUM SULFUR BATTERIES; which claims priority to U.S. Provisional Patent Application Nos. 61/585,589, filed Jan. 11, 2012, titled AQUEOUS LITHIUM-SULFUR BATTERY CELL, and 61/560,134, filed Nov. 15, 2011, titled AQUEOUS LITHIUM-SULFUR BATTERY. Application Ser. No. 13/676,487 also claims priority from U.S. Provisional Patent Application Nos. 61/623,031, filed Apr. 11, 2012, titled AQUEOUS ELECTROLYTE LITHIUM SULFUR BATTERIES.

Each of these applications is incorporated herein by reference in its entirety and for all purposes.

STATEMENT OF GOVERNMENT SUPPORT

This invention was made with Government support under Award No.: DE-AR0000349 awarded by the Advanced Research Projects Agency-Energy (ARPA-E), U.S. Department of Energy. The Government has certain rights in this invention.

FIELD OF THE DISCLOSURE

The present disclosure relates generally to the field of electrochemical energy storage and power delivery. In particular, the present disclosure relates to aqueous lithium-sulfur electrolytes, lithium-sulfur cathodes, and lithium-sulfur battery cells, including flow cells and systems thereof, and methods of making and operating such electrolytes, cathodes and cells.

BACKGROUND

The lithium sulfur battery has a theoretical capacity of 1675 mAhg$^{-1}$ and approximately 2300 Wh/kg. The low cost and exceptionally high specific capacity of sulfur renders it an especially attractive battery cathode material for large-scale energy storage, including electric vehicle and grid storage applications. Yet after more than twenty years of research and development at various battery companies and scientific institutions worldwide, key technical problems with the sulfur electrode have precluded meaningful commercialization of the Li—S battery. The present disclosure addresses the sulfur electrode problem through the use of novel aqueous electrolyte formulations and cathode structures.

SUMMARY

In one aspect the present disclosure provides novel active sulfur containing aqueous electrolytes (i.e., aqueous catholytes) for use in lithium sulfur battery cells and lithium sulfur battery cells thereof.

The instant aqueous lithium sulfur battery cells include a lithium anode comprising a lithium electroactive material such as lithium metal or a carbon intercalation material; a cathode comprising a solid electron transfer medium; and an aqueous electrolyte in electron transfer contact with the cathode but isolated from direct contact with the lithium electroactive material of the anode, the aqueous electrolyte comprising water and electroactive sulfur species dissolved therein.

Identifying the precise chemical nature of the various active sulfur species dissolved in the electrolyte solution (i.e., catholyte solution) is difficult, if at all possible. However, given that the solution is electrically neutral, the overall stoichiometry of the aqueous electrolyte solution, and in particular that as it pertains to the dissolved electroactive species, is characterizable and may be expressed herein, and in the claims, in terms of an "active lithium sulfur stoichiometric ratio" or more simply an "active stoichiometric ratio," which, as defined herein, is the ratio of active sulfur to active lithium dissolved in the electrolyte solution, and is represented by the general formula $Li_2S_x$. For the sake of simplicity, the parameter "x" in the aforesaid formula is sometimes referred to herein, and in the claims, as the "stoichiometric factor." For instance, the aqueous electrolyte solution of battery cells of the instant disclosure may be characterized as having a stoichiometric factor (i.e., x) in the range of 1 to 8, for example. For example, an aqueous electrolyte solution characterized as having a stoichiometric factor of x=8, has an active stoichiometric ratio of 8:2, which when represented as a quotient is 4; or a stoichiometric factor of x=5 has an active stoichiometric ratio of 5:2, which as a quotient is 2.5.

By use of the term electron transfer contact it is meant that the direct touching contact between the aqueous electrolyte solution and the electron transfer medium (ETM) is sufficiently intimate to allow for electron transfer, associated with cell discharge and/or charge, to take place between dissolved active sulfur species and the electron transfer medium (i.e., the contact sufficient to enable electrochemical redox). In contradistinction to the intimate contact described hereinabove for the electron transfer medium and the aqueous sulfur catholyte solution, it should be emphasized that the lithium electroactive material (e.g., lithium metal) and the aqueous sulfur electrolyte solution are not in direct contact and never touch, and that this complete touching isolation is maintained throughout the course of battery cell storage and operation. Accordingly, by this expedient, there is no need to adjust or modify or even consider the composition of the aqueous electrolyte solution for chemical compatibility with the lithium electroactive material. It should be noted that the terms aqueous sulfur electrolyte solution and aqueous sulfur catholyte solution are herein used interchangeably.

In one aspect the present disclosure provides a secondary aqueous lithium sulfur battery cell having a novel aqueous electrolyte that promotes cathodic reversibility during cell charging, and by this expedient enhances cycle life especially when cycling at high area capacity. For instance, when compared to comparable cells cycled in an aqueous electrolyte having a solvent system that is substantially neat water, the instant cells have improved cycling performance and achieve more than 10 cycles, and preferably more than 50 cycles, and even more preferably more than 100 cycles at area capacities of about or greater than 1 mAh/cm$^2$, preferably greater 5 mAh/cm$^2$, and more preferably greater than 10 mAh/cm$^2$ and even more preferably greater than 15 mAh/cm$^2$ per discharge/charge cycle. By use of the term area capacity it is meant the apparent (or geometric) area of the cathode, and in particular the apparent area of the electron transfer medium.

In various embodiments the novel aqueous electrolyte includes an aqueous electrolyte solution composed of electroactive sulfur species dissolved in an aqueous solvent system comprising at least two solvent components, and the amount of active sulfur species dissolved (i.e., solubilized) in the solvent system is suitable for a practical lithium sulfur battery cell of the closed or flow cell type. For example, depending on the cell state of charge, the sulfur concentration of the solution may be between about 1 and 15 molar. In various embodiments the cell is closed and preferably all of the electroactive sulfur species remain in the solution phase over the course of cell operation, and for such closed cells the sulfur concentration is typically about 10 molar or greater (e.g., between 10-15 molar sulfur).

In various embodiments the first solvent component is water and the second solvent component is a cycle-life enhancing compound that serves to facilitate electrochemistry at the cathode, and in particular to facilitate charging at the cathode. In various embodiments, the water serves, in part, as a reactive solvent for maintaining highly reduced electroactive sulfur species solubilized in the solution during cell discharge and charge, and as such should be present in sufficient amount to achieve the desired effect. The water facilitates electrochemistry at the cathode, especially when the stoichiometric factor of the solution reaches, or is, a value of about 3 or below 3 (e.g., $3>x>2$), or below 2 (e.g., $2>x>1$), or approaching 1 (e.g., x is about 1 or 1). The cycle-life enhancing compound also facilitates cathode electrochemistry, but in particular facilitates electrochemistry in solutions characterized as having a relatively high stoichiometric factor, such as that approaching 4, or about 4, or greater than 4 (e.g., $4<x<5$), or greater than 5 (e.g., $4<x<5$) or greater than 6 (e.g., $6<x<7$) or greater than 7 (e.g., $7<x<8$) or in some embodiments greater than 8 (e.g., $8<x<12$). For instance, in various embodiments the cycle-life enhancing compound facilitates charging at the cathode such that the aqueous electrolyte solution achieves, as a result of said charging, a stoichiometric factor (x) that is greater than 5, and in some embodiments greater than 6 and in some embodiments greater than 7 or even greater than 8; for instance, the stoichiometric factor (x) may have a value effected by charge that of $5<x<6$, $6<x<7$ and $6<x<7$, and $8<x<12$. The water solvent component facilitates cathode reversibility when the stoichiometric factor is below 4, and in particular is below 3 or below 2, whereas the cycle-life enhancing compound, when present in sufficient amount, facilitates discharge and especially charge when the aqueous catholyte solution approaches its full state of charge. For example the cycle-life enhancing compound promotes charging of the electrolyte solution to a stoichiometric factor otherwise not attainable if water were the sole solvent component (i.e., the solvent is neat water); for example, a stoichiometric factor greater than 5, (e.g., 6, 7, 8, 9, 10, 11, 12) as discussed in more detail below.

Of particular import to the aforesaid discussion is, what is termed herein, the stoichiometric solubility limit of the catholyte solution, which is a value that corresponds to the stoichiometric factor at which active polysulfide species are no longer completely soluble and begin to precipitate out of the electrolyte solution at practical sulfur concentrations. By practical sulfur concentrations it is meant sulfur concentrations in excess of 1 molar, and more commonly in excess of 3 molar and typically 10 molar or higher. The inventors determined that for an aqueous lithium polysulfide electrolyte having a solvent system of neat water, the "stoichiometric solubility limit" is about 4.6, which means that at stoichiometric factors greater than about 4.6 the electrolyte solution becomes unstable to full dissolution, and, in particular, solid phase active sulfur species precipitate out of the electrolyte solution. It should be understood that precipitation of active sulfur species on charge is by itself not necessarily a limiting factor for cell performance. Indeed, non-aqueous lithium sulfur cells are well known for being loaded with solid phase elemental sulfur in the cathode. However, in aqueous lithium sulfur cells, the inventors discovered that by formulating the aqueous solvent system with a cycle-life enhancing compound, the sulfur electrolyte solutions can achieve stoichiometric factors greater than 5 (e.g., between 5 and 12) and that this leads to enhanced cathode reversibility, especially for high area capacity cycling. Accordingly, when present in sufficient amount, the cycle-life enhancing compounds extend the stoichiometric solubility limit of the instant aqueous polysulfide electrolytes beyond a stoichiometric factor of 5, and this facilitates electrochemical oxidation kinetics at the cathode during cell charging, and ultimately leads to enhanced cycle life.

An important utility of the cycle-life enhancing compound is its chemical action during charge in aqueous electrolyte solutions having a stoichiometric factor greater than 4 and in particular greater than 5. In various embodiments, the chemical action is solvolysis, wherein the compound serves as a reactive solvent for solubilizing or maintaining in solution electroactive sulfur species having a stoichiometric factor of about 4 or greater.

Thus, in another aspect, the present disclosure provides an aqueous lithium sulfur battery cell having an aqueous catholyte solution of practical sulfur concentration which is capable of achieving, over the course of cell discharge and charge, a broad range of stoichiometric factors, from about 1 to 12 or from about 1 to 8, or from 1 to 5, or about 2 to 5, or from 1 to 6 or about 2 to 6, or from 1 to 7 or about 2 to 7 depending on the nature and concentration of the cycle-life enhancing compound.

Accordingly, in various embodiments the cell is a solvolysis battery cell, wherein solvolysis is relied upon to achieve an electrolyte solution having a low stoichiometric factor on discharge and a high stoichiometric factor on charge. For instance, on discharge the stoichiometric factor reaches a value that is less than 3 or less than 2 or between 2 and 1, or about 1, and on charge the factor reaches a value that is greater than 4, for instance, between 5 to 6, or between 6 to 7 or between 7 to 8, or between 8 to 12. Generally, over the course of battery cell operation, the active stoichiometric factor of the active species will vary over a broad range, and in particular that including values between 1 and 8, depending on how deeply the cell is discharged and the charging protocol.

In various embodiments the cycle life enhancing compound is present in a sufficient amount for the instant cell to achieve more than 10 cycles at greater than 400 mAh/gr of active sulfur, and more preferably greater than 600 mAh/gr of active sulfur, and even more preferably about 1000 mAh/gr of active sulfur or greater. Moreover, the cycle-life enhancing compound has been found to provide particular benefit for improving reversibility and thus enhancing cycle life at high area capacity. In embodiments the incorporation of the cycle-life enhancing compound improves electrochemical reversibility such that the cell is capable of achieving extended number of cycles at high cathode area capacity greater than 5 mAh/cm$^2$, greater than 10 mAh/cm$^2$ and greater than 15 mAh/cm2, wherein the area term is based on the apparent area of the cathode. For instance, the instant cell achieving more than 20 cycles with a cathode area capacity greater than 5 mAh/cm$^2$ (greater than 10 mAh/cm$^2$, and greater than about 15 mAh/cm$^2$) per discharge cycle for preferably greater than 50 cycles.

The cycle-life enhancing compound is present in the aqueous electrolyte solution as a component of the aqueous solvent system. In various embodiments the cycle-life enhancing compound is polar and miscible with water, as such the solvent system is homogenous. In embodiments wherein the cycle-life enhancing compound is a solid or a gas, it (the cycle-life enhancing compound) is dissolved in the water of the solvent system, and typically fully dissolved. In fact, a cycle-life enhancing liquid compound that is miscible with water in the solvent system, is also considered herein to be dissolved in the water, and that terminology is used herein and in the claims.

In various embodiments the cycle-life enhancing compound modifies the chemistry of the electrolyte such that the electrolyte solution has a stoichiometric factor greater than 5, and that refers to the catholyte solution prior to initial cell operation and/or as a result of charging the cell. A factor of greater than 5 is particularly intriguing in that the highest stoichiometric factor obtainable in aqueous sulfur catholyte having water as the sole solvent has been determined by the inventors to be about 4.6 at practical sulfur concentrations typically in the range of 3 to 15 molar.

In contradistinction to what may be achieved in an electrolyte having neat water as the sole electrolyte solvent, in various embodiments the instant battery cell is fabricated such that prior to initial cell operation, the concentration of electroactive species dissolved in the aqueous electrolyte solution has a stoichiometric factor that is greater than 5, and in some embodiments between 5 and 6, or between 6 and 7 or between 7 and 8 or between 8 and 12, and an active sulfur concentration that is at least 5 molar, and preferably greater; for instance, at least 6 molar; at least 7 molar; at least 8 molar; at least 9 molar; at least 10 molar; at least 11 molar; at least 12 molar; at least 13 molar; at least 14 molar; at least 15 molar. Moreover, in certain embodiments thereof all of the cell capacity (i.e., sulfur capacity), is present as electroactive sulfur species dissolved in the aqueous electrolyte solution. Furthermore, with reference to the aforesaid embodiments, in addition to the cell having a sulfur molarity commensurate with a practical fully sealed battery cell, the stoichiometric factor, given a sufficient amount of cycle-life enhancing compound present in the electrolyte, is greater than 5, and in some embodiments is between 5 and 6, and in other embodiments is between 6 and 7 and still yet in other embodiments the stoichiometric factor is between 7 and 8 or between 8-12.

In various embodiments the amount of cycle-life enhancing compound is sufficient that the instant cell may be cycled (e.g., at least 10 cycles) to its rated capacity without elemental sulfur precipitating out of solution during charge. For instance, the cell achieving more than 10 cycles at greater than 400 mAh/gr of sulfur, greater than 600 mAh/gr of sulfur and even more preferably about at least 1000 mAh/gr of sulfur, without said precipitation taking place.

The pH of the aqueous electrolyte solution, absent the cycle-life enhancing compound, is generally relatively high, and in embodiments the pH of the electrolyte is greater than 12 (e.g., between 12 and 13 or about 13 or greater than 13). Moreover, regarding pH of the electrolyte solution, in various embodiments the amount of cycle-life enhancing compound present in the aqueous electrolyte is sufficient to effect a pH of the aqueous solvent system (i.e., the solution devoid of electroactive sulfur) that is greater than 12, e.g., about 13 or 14. Notably, aqueous sulfur electrolyte solutions of practical sulfur concentrations are strongly basic and the addition of the cycle-life enhancing compound has effectively no significant bearing on the pH of the electrolyte solution, given that the high concentration of dissolved active sulfur species, which on its own effects a solution pH generally greater than 12, and can be as high as 13 or 14.

In various embodiments the cycle-life enhancing compound is not a metal salt or even an ionic salt, but rather a covalently bound molecule, and thus when present in sufficient amount to enhance electrochemical reversibility at the cathode, it generally decreases the conductivity of the electrolyte relative to the same electrolyte devoid of the cycle-life enhancing compound. Moreover, at very high dissolved sulfur concentrations (e.g., in excess of 15 molar sulfur) the presence of the cycle-life enhancing compound can increase viscosity to levels impractical for use in a closed or flow battery cell.

The aqueous solvent system comprises a substantial amount of water as a reactive solvent. Typically the volume percent of water in the aqueous solvent system is greater than 10%. More typically the volume percent of water in the aqueous solvent system is >10-20%; between >20%-30%; between >30%-40%; between >40%-50%; between >50%-60%; between >60%-70%; between >70%-80%; between >80%-90%; between >90%-95%. Furthermore, as it pertains to water in the aqueous solvent system, the amount of water in the solvent system is, in various embodiments, greater than 10%, greater than 20%, greater than 30%, greater than 40%, greater than 50%, greater than 60%, greater than 70%, greater than 80%, greater than 90%. The volume of water sufficient to serve its purpose as an electrolyte medium for supporting the ionic current through the battery cell and for serving as a reactive solvent for maintaining electroactive sulfur species in solution (i.e., dissolved in the aqueous electrolyte solution) during cell discharge, and for providing a medium for facilitating charging at or near the end of discharge, e.g., when the active stoichiometric factor is less than 3 (e.g., about 2 or 1).

Accordingly, in various embodiments the instant battery cell is a secondary battery cell. In various embodiments the amount of cathodic cycle-life enhancing compound is sufficient to yield a cell whereby the total capacity is provided by dissolved active sulfur species, and the delivered capacity of said dissolved sulfur species corresponds to a value that is greater than 700 mAh/gram of dissolved sulfur over at least 2 cycles. Moreover, the cycle-life enhancing compound facilitates charging at the cathode and especially serves to facilitate charging at or near the cell state of full charge. For instance, in various embodiments the cycle-life enhancing compound facilitates charging at the cathode so that at stoichiometric factors greater than 4, greater than 5 or between 6 and 7 or between 7 and 8, the cell does not unduly polarize on charge, and the cell voltage reaches a stoichiometric factor of 4-5 or 5-6 or 6-7 or 7-8 without undue cell polarization. For instance, in various embodiments the cell achieves at least 10 cycles and on each charge cycle the active stoichiometric ratio of the aqueous electrolyte solution reaches a value greater than 5 with minimal or no precipitation of solid phase sulfur; or the cell achieves at least 10 cycles and on each charge cycle the active stoichiometric ratio of the aqueous electrolyte solution reaches a value greater than 6 with minimal or no precipitation of solid phase sulfur; or the cell achieves at least 10 cycles and on each charge cycle the active stoichiometric ratio of the aqueous electrolyte solution reaches a value greater than 7 with minimal or no precipitation of solid phase sulfur.

In various embodiments the aqueous electrolyte solution has an active stoichiometric ratio represented by the chemical formula $Li_2S_x$, with x having a value between 1 and 7.

In various embodiments the cycle life enhancing compound is present in an amount sufficient to support an aqueous electrolyte solution having an active stoichiometric ratio represented by the chemical formula $Li_2S_x$, wherein x is greater than 5.

In various embodiments the cycle life enhancing compound is present in an amount sufficient to support an aqueous electrolyte solution having an active stoichiometric ratio represented by the chemical formula $Li_2S_x$, wherein x is in the range selected from the group consisting of $5<x<6$, $6<x<7$, $7<x<8$. In embodiments thereof the amount of cycle life enhancing compound present in the aqueous solvent system is at least 0.1 molar, at least 0.5 molar, or at least 1.0 molar. In embodiments thereof the amount of cycle life enhancing compound present in the aqueous solvent system is in the molar range selected from the group consisting of $0.1<z<1.0$; $1.0<z<2.0$; $2.0<z<3.0$; $3.0<z<4.0$; $4.0<z<5.0$; $5.0<z<6.0$; $6.0<z<7.0$; $7.0<z<8.0$; $8.0<z<9.0$; $9.0<z<10.0$; $10.0<z<11.0$.

In embodiments thereof the amount of cycle life enhancing compound present in the aqueous solvent system is in the range of 1-60 vol %.

In embodiments thereof the amount of cycle life enhancing compound present in the aqueous solvent system is in the range of 5-50 vol %.

In embodiments thereof, prior to initial cell operation, the concentration of electroactive sulfur species dissolved in the aqueous electrolyte solution is at least 5 molar; at least 6 molar; at least 7 molar; at least 8 molar; at least 9 molar; at least 10 molar; at least 11 molar; at least 12 molar; at least 13 molar; at least 14 molar; at least 15 molar.

In embodiments thereof, prior to initial cell operation, all of the sulfur capacity of the cell is present as electroactive sulfur species dissolved in the aqueous electrolyte solution. In embodiments thereof the cell is cycled to its rated capacity without precipitating elemental sulfur during charge. In embodiments thereof the rated capacity of the cell based on the weight of electroactive sulfur in the cell is greater than 500 mAh/gr of sulfur, preferably greater than 600 mAh/gr and even more preferably greater than 1000 mAh/gr of sulfur.

In various embodiments the pH of the electrolyte absent the cycle life enhancing compound is greater than 12.

In various embodiments the sufficient amount of cycle life enhancing compound would, absent the dissolved electroactive sulfur species, bring the electrolyte pH to a value greater than 12.

In various embodiments the cycle life enhancing compound is not a metal salt.

In various embodiments the compound at the molecular level is a covalently bound molecule that dissolves in neat water but does not dissociate in neat water.

In various embodiments the volume percent of water in the aqueous solvent system is at least 10%.

In various embodiments the volume percent of water in the solvent system is selected from the group consisting of between >10%-20%; between >20%-30%; between >30%-40%; between >40%-50%; between >50%-60%; between >60%-70%; between >70%-80%; between >80%-90%; between >90%-95%.

In various embodiments the amount of water in the solvent system is selected from the group consisting of greater than 10%, greater than 20%, greater than 30%, greater than 40%, greater than 50%, greater than 60%, greater than 70%, greater than 80%, greater than 90%.

In various embodiments the aqueous lithium sulfur battery cell is a secondary battery. In embodiments thereof the amount of said cathodic cycle life enhancing compound is sufficient to yield a cell whereby the total capacity is provided by dissolved active sulfur species, and the delivered capacity of said dissolved sulfur species corresponds to a value that is greater than 700 mAh/gram of dissolved sulfur over at least 2 cycles. In embodiments thereof, upon charging the cell beyond a stoichiometric factor of x=4 to x=5 the cell does not unduly polarize; that is the cell does not polarize to the extent that the cell voltage remains below 3 Volts.

In various embodiments the cell achieves at least 10 cycles and on each charge cycle and the active stoichiometric ratio of the aqueous electrolyte solution reaches a value greater than 5 with minimal or no precipitation of solid phase sulfur.

In various embodiments the cell achieves at least 10 cycles and on each charge cycle the active stoichiometric ratio of the aqueous electrolyte solution reaches a value greater than 6 with minimal or no precipitation of solid phase sulfur.

In various embodiments the cell achieves at least 10 cycles and on each charge cycle the active stoichiometric ratio of the aqueous electrolyte solution reaches a value greater than 7 with minimal or no precipitation of solid phase sulfur.

In various embodiments the cycle-life enhancing compound is an organic compound, and in particular a polar organic compound. In certain embodiments thereof it (the cycle-life enhancing compound) is a protic organic compound. The cycle-life enhancing organic compound may be a solid or liquid or gas in the standard state (which by standard state it is meant the neat compound at 25° C. and 1 atm). In embodiments thereof it is a protic organic compound that is a liquid in the standard state. In various embodiments the cycle-life enhancing organic compound is a nitrogen-containing (N-containing) organic compound. In certain embodiments thereof the cycle-life enhancing organic N-containing compound is a liquid or a solid in the standard state. The cycle-life enhancing organic nitrogen containing liquid compound may be protic. In particular embodiments the cycle-life enhancing organic nitrogen containing compound is an amine, which may be a primary amine, a secondary amine, and in some embodiments it is a tertiary amine.

In various embodiments the cycle-life enhancing organic compound is represented by the general formula:

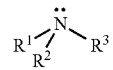

wherein R¹ is H or an organic radical (i.e., functional group), R² is H or an organic radical, and R³ is H or an organic radical. In some embodiments, at least one of said R groups is an organic functional group (also sometimes referred to herein as a radical). In various embodiments one of said R groups contains an amine functional group, or two of said R groups contain an amine functional group, and optionally both amine groups are different or the same. In other embodiments all three R groups contain amine functional groups, and optionally all three are different or all three are the same or two are the same. In yet other embodiments none of said R groups contain ether or hydroxyl groups.

In various embodiments the cycle-life enhancing organic compound is an amine selected from the group consisting of ethylenediamine, diethylenetriamine, trimethylamine, n-propylamine, methylamine, dimethylamine, ethylamine, diethylamine, isopropylamine, diisopropylamine, dimethylaminopropylamine, diethylenetriamine, allylamine, tetraethylenediamine, tetramethylpropylenediamine, pentamethyldiethylenetri amine, cyclopropylamine, 2-methoxyethylamine, (2-methoxyethyl)methylamine, 3-methoxypropylamine, bis(2-methoxyethyl)amine, 2-methoxyisopropylamine, 2,2-dimethoxyethylamine, 3-ethoxy-1-propanamine, 2-(2-aminoethoxy)ethylamine, and 2,2-(ethylenedioxy)bis(ethylamine).

In embodiments one of said R groups is an hydroxyl functional group or two of said R groups are hydroxyl functional groups, and are optionally the same or different. In embodiments all of said R groups are hydroxyl functional groups, and are optionally the same or different or two are the same In various embodiments the organic compound is selected from the group consisting of 2-(ethylamino)ethanol, ethanolamine, diethanolamine, N-methylethanolamine, N-methyldiethanolamine, 2-amino-2-methyl-1-propanol, N,N-dimethylethanolamine, 2-(2-aminoethoxy)ethanol.

In embodiments one of said R groups is an ether functional group or two of said R groups are ether functional groups, and are optionally the same or different. In embodiments all of said R groups are ether functional groups, and are optionally the same or different or two are the same.

In various embodiments at least one of said R groups is selected from the group consisting of optionally substituted $C_1$-$C_{10}$ alkyl group, optionally substituted $C_2$-$C_{10}$ alkenyl group, and optionally substituted $C_2$-$C_{10}$ alkynyl group, wherein a substituted group is derived from the unsubstituted parent structure in which one or more hydrogen atoms are exchanged for another atom or a group of atoms.

In various embodiments at least one of said R groups is selected from the group consisting of optionally substituted $C_4$-$C_{10}$ cycloalkyl, optionally substituted $C_4$-$C_{10}$ cycloalkenyl, and optionally substituted 3-10 membered heterocyclyl, wherein a substituted group is derived from the unsubstituted parent structure in which one or more hydrogen atoms are exchanged for another atom or a group of atoms.

In embodiments at least one of said R groups is selected from the group consisting of optionally substituted carbo- and heterocyclic 5-10 membered aryl, or a benzylic group, wherein a substituted group is derived from the unsubstituted parent structure in which one or more hydrogen atoms are exchanged for another atom or a group of atoms.

In various embodiments the cycle-life enhancing organic compound is selected from the group consisting of ethylenediamine, 2-methoxyethylamine, bis(2-methoxyethyl) amine, 2-(methylamino)ethanol, n-propylamine, methylamine, dimethylamine, ethylamine, diethylenetriamine.

In various embodiments the cycle life enhancing organic compound is a nitrogen containing heterocyclic compound. In embodiments thereof the nitrogen containing heterocyclic compound has the general formula:

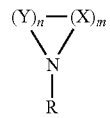

wherein m, n=1, 2, 3, 4, 5, and (m+n) is less than 6; and further wherein X is selected from the group consisting of
X is $CR^1R^2$ (optionally substituted methylene group), where $R^1$ and $R^2$ represent H or an organic radical, or
X is $CR^1$ (when N-heterocycle is unsaturated or aromatic) where $R^1$ represents H or an organic radical, or
X is N (X is nitrogen atom when N-heterocycle is unsaturated or aromatic), or
X is $NR^3$ (X is $NR^3$ group), where $R^3$ represents H or an organic radical, or
X is O (X is oxygen atom), or
X is S (X is sulfur atom).

In various embodiments the nitrogen containing heterocycle is selected from the group of saturated N-heterocycles, aromatic N-heterocycles, and unsaturated N-heterocycles, that optionally contain X=X, X=Y, X=N, Y=N double bonds where X is not oxygen atom and is not sulfur atom.

In embodiments the nitrogen containing heterocycle is miscible with water.

In various embodiments the nitrogen containing heterocycle is a liquid in the standard state. For example the liquid may be morpholine, pyrrolidine, piperidine, pyridine, aziridine, 1,4-thiazine.

In various embodiments the nitrogen containing heterocycle is a solid in the standard state.

In various embodiments the cycle-life enhancing liquid is selected from the group consisting of imidazole, thiomorpholine, piperazine.

In various embodiments the cycle-life enhancing organic compound is an alcohol. For example, suitable alcohols include methanol, ethanol, n-propanol, i-propanol.

In various embodiments the cycle-life enhancing organic compound is a glycol. Suitable glycols include ethylene glycol, glycerol, and polyglycols such as polyethylene glycol.

In various embodiments the cycle-life enhancing organic compound is a glycol ether, such as ethylene glycol monomethyl ether (2-methoxyethanol), diethylene glycol monoethyl ether (carbitol), diethylene glycol monomethyl ether (methyl carbitol), ethylene glycol monoethyl ether (2-ethoxyethanol), ehylene glycol monopropyl ether (2-propoxyethanol, ethylene glycol monoisopropyl ether, ethylene glycol monobutyl ether, diethylene glycol mono-n-butyl ether.

In various embodiments the organic compound is a polar aprotic liquid; for instance, a polar aprotic liquid may be a linear or cyclic ether. Particular polar aprotic liquids are tetrahydrofuran (THF), 4-methyl-1,3-dioxolane (4-Me-DIOX), tetrahydropyran (THP)), glymes (e.g., 1,2-dimethoxyethane (DME/monoglyme), diglyme, triglyme, tetraglyme and higher glymes.

In various embodiments the cycle-life enhancing organic compound is an amide, such as formamide, N,N-dimethylacetamide (DMA), N,N-dimethylformamide (DMF), N-methylformamide, N-ethylformamide, N,N-diethylacetamide, N,N-diethylformamide.

In various embodiments the aforesaid cycle-life enhancing compounds are miscible with water when a liquid and or soluble in water when a solid in the standard state.

In various embodiments the cycle-life enhancing compound is ammonia. In embodiments the amount of ammonia in the aqueous solvent is greater than 5% (m/m). In embodiments the amount of ammonia in the aqueous solvent is between 5 to 35% (m/m). In embodiments the amount of ammonia in the aqueous solvent is between 14 to 33% (m/m). In embodiments the amount of ammonia present in the aqueous solvent system is at least 0.1 molar, at least 0.5 molar, or at least 1.0 molar. In embodiments the amount of ammonia present in the aqueous solvent system is in the molar range of: $0.1<z<1.0$; $1.0<z<2.0$; $2.0<z<3.0$; $3.0<z<4.0$; $4.0<z<5.0$; $5.0<z<6.0$; $6.0<z<7.0$; $7.0<z<8.0$; $8.0<z<9.0$; $9.0<z<10.0$; $10.0<z<11.0$.

In various embodiments the aqueous lithium sulfur battery cell provides a medium for twofold solvolysis of electroactive sulfur species, the firstfold solvolysis taking place during discharge and the secondfold solvolysis taking place during charge, the water serving to solubilze, via hydrolysis, active sulfur species on discharge and the cycle life enhancing compound serving as a reactive solvent for solubilizing electroactive sulfur species on charge. In various embodiments the first solvolysis causes highly reduced electroactive sulfur species to remain dissolved in the electrolyte solution on discharge and wherein the active stoichiometric ratio of said solution on discharge is $Li_2S_X$ with x less than 3, and the second solvolysis causes highly oxidized electroactive sulfur species to remain dissolved in the electrolyte solution on charge, wherein the active stoichiometric ratio of said solution on charge is represented by $Li_2S_X$ with x greater than 5. In accordance with the solvolysis, the water serves as a reactive solvent for hydrolyzing active sulfur species in solution, especially when the active stoichiometric factor is less than 3 (e.g., about 1), and the cycle-life enhancing compound, dissolved in the water of the solvent system, also serves as a reactive solvent for solubilizing active sulfur species, especially when the aqueous electrolyte solution is has a stoichiometric factor greater than 5.

In embodiments thereof the cycle-life enhancing compound is an organic compound. In embodiments thereof the secondfold solvolysis takes place via aminolysis. In embodiments thereof the organic compound is an amine or a compound comprising an amine functional group. In embodiments thereof the secondfold solvolysis takes place via ammonolysis. In embodiments thereof the cycle-life enhancing compound is ammonia. In embodiments thereof the pH of the electrolyte absent the cycle life enhancing compound is greater than 12. In embodiments thereof the sulfur molarity of the aqueous electrolyte solution is greater than 5 molar. In embodiments thereof the active stoichiometric ratio of the aqueous electrolyte solution is between 5 and 6 and the secondfold solvolysis maintains all of the active sulfur species in solution. In embodiments thereof the active stoichiometric ratio of the aqueous electrolyte solution is between 6 and 7 and the secondfold solvolysis maintains all of the active sulfur species in solution. In embodiments thereof the active stoichiometric ratio of the aqueous electrolyte solution is between 7 and 8 and the secondfold solvolysis maintains all of the active sulfur species in solution.

In various embodiments during the course of cell operation, the active stoichiometric ratio of the aqueous electrolyte solution is greater than 5. In various embodiments the active stoichiometric ratio of the aqueous solution is greater than 6. In various embodiments the active stoichiometric ratio is greater than 7. In various embodiments the active stoichiometric ratio of the aqueous electrolyte solution is between 5 and 6. In various embodiments the active stoichiometric ratio of the aqueous electrolyte solution is between 6 and 7. In various embodiments the active stoichiometric ratio of the aqueous electrolyte solution is between 7 and 8.

In embodiments thereof the cell may be discharged to an active stoichiometric ratio of less than 3 and subsequently charged to an active stoichiometric ratio greater than 5 without undue cell polarization. In embodiments thereof the instant cell may be discharged to an active stoichiometric ratio of less than 3 and subsequently charged to an active stoichiometric ratio greater than 6 without undue cell polarization. In embodiments thereof the cell may be discharged to an active stoichiometric ratio of less than 3 and subsequently charged to an active stoichiometric ratio greater than 7 without undue cell polarization.

With regard to the aforesaid embodiments, in various embodiments the amount of cycle life enhancing compound is sufficient to prevent elemental sulfur from precipitating out of the electrolyte solution having an active stoichiometric ratio that is greater than 5.

With regard to the aforesaid embodiments the active sulfur concentration in the cell in the fully charged state is generally greater than 1 molar and typically greater than 3 molar and for a closed cell preferably 10 molar or greater (e.g., 11 molar, 12 molar, 13 molar, 14 molar or 15 molar active sulfur concentration).

In various embodiments the aqueous electrolyte includes a novel combination of electro-active lithium sulfur species (e.g., lithium polysulfides), water and one or more nitrogen—containing compounds (sometimes referred to herein as an N-compound or N-solvent), wherein the water and N-compound serve as a solvent for the electro-active lithium sulfur species. The solvent combination of water and the N-compound is synergistic in that the combination yields superior performance compared to that of an electrolyte based on water or the N-solvent alone.

In some embodiments the N-compound is organic and exemplified by that of an amine. In embodiments thereof the amine may be a primary, secondary or tertiary amine such as that represented by the following general formula:

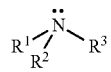

wherein $R^1$ is H or an organic radical (i.e., functional group), $R^2$ is H or an organic radical, and $R^3$ is H or an organic radical.

In some embodiments the N-compound is an organic compound having an amine functional group. In other embodiments the N-compound is heterocyclic.

In other embodiments the N-compound is ammonia.

Preferably the N-compound has a high Gutmann donor number. Typically, the aqueous electrolyte is a liquid and at least a portion of the electro-active lithium sulfur species are dissolved in the water/amine based electrolyte or the water/ammonia based electrolyte. In various embodiments the proportion of amine to water or that of ammonia to water results in a miscible mixture. Combinations of water, amines and ammonia are also contemplated herein for their use in the instant aqueous electrolytes.

Other solvents may be added to the aforementioned instant electrolytes, and these solvents include protic compounds such as alcohols and glycol ethers as well as polar and non-polar aprotic solvents. Typically the combination of water and the N-compound (be it an amine or ammonia or a combination thereof) accounts for more than 50% of the solvent volume in the electrolyte; for instance, from 50% to 75%, or from 75% to 90% and in certain embodiments water and the N-containing compound(s) are the sole solvents in the electrolyte.

In another aspect, the disclosure provides an aqueous lithium sulfur battery cell having an anode structure comprising an electroactive material, a cathode comprising a solid electron transfer medium, an aqueous electrolyte in contact with the electron transfer medium, and active sulfur species in contact with the aqueous electrolyte, and wherein the anode electroactive material is isolated from direct contact with the aqueous electrolyte. Notably, while the anode electroactive material is isolated from touching (i.e., directly contacting) the aqueous electrolyte, it is nonetheless configured in the anode structure to be in lithium ion communication with the aqueous electrolyte. Moreover, because the aqueous electrolyte does not touch the anode electroactive material but does directly contact the cathode the term "aqueous catholyte" (or more simply "catholyte") is used interchangeably with the term "aqueous electrolyte".

In various embodiments, the aqueous electrolyte is electroactive in that it contains dissolved active sulfur species that undergo electrochemical redox at the cathode during discharge and charge. Without limitation, the dissolved redox active sulfur species may include sulfide anions ($S^{2-}$), hydrosulfide anions ($HS^-$), and polysulfide anions including $S_x^{2-}$ with x>1 (e.g., $S_2^{2-}$, $S_3^{2-}$, $S_4^{2-}$, $S_5^{2-}$, $S_6^{2-}$) and related radical anions $S_x^-$, and combinations thereof.

In various embodiments, the amount of water in the catholyte is significant (i.e., not merely a trace amount). In various embodiments the volume percent of water or N-solvent relative to the total liquid solvent volume in the catholyte is greater than 5%, 10%, 20%, 30%, 40%, 50%, 60%, 70%, 80%, and greater than 90%. In certain embodiments water and the N-solvent are the only solvents in the catholyte (i.e., water and the N-solvent constitute 100% of the solvent volume of the catholyte). In various embodiments water or the N-solvent is the main liquid solvent in the catholyte. By use of the term main liquid solvent, it is meant that the volume percent of the main solvent in the catholyte is greater than the volume percent of any other liquid solvent.

Water has unique properties. In the aqueous sulfur catholyte solutions described herein, the presence of water provides a number of benefits, including high solubility for active sulfur species, including lithium sulfide ($Li_2S$), very high ionic conductivity even at high sulfur concentrations, and fast dissolution kinetics. The combination of high solubility, high conductivity, and fast dissolution kinetics provides compelling lithium sulfur battery performance.

Accordingly, in various embodiments the cell is fabricated with an aqueous catholyte having a high concentration of active sulfur species already dissolved therein. In other words, the cell has a significant amount of dissolved active sulfur species adjacent the electron transfer medium even before the cell has been initially operated (e.g., initially discharged and/or initially charged), and by this expedient the fast electro-kinetics of solution phase redox can be used to advantage, especially, but not exclusively, for applications that require high current drain immediately upon start up. For instance, in various embodiments, prior to initially operating the cell, the active sulfur concentration of dissolved active sulfur species in the aqueous electrolyte is greater than 0.5 molar sulfur, 1 molar sulfur, 2 molar sulfur, 3 molar sulfur, 4 molar sulfur, 5 molar sulfur, 6 molar sulfur, 7 molar sulfur, 8 molar sulfur, 9 molar sulfur, 10 molar sulfur, 11 molar sulfur, or greater than 12 molar sulfur. Herein and in the claims, by the use of the term "molar sulfur" it is meant the number of moles of sulfur per liter of electrolyte. Moreover, by use of the phrase "just prior to initially operating the cell" or "prior to initial cell operation" it is meant, herein and in the claims, to mean the first (i.e., initial) electrochemical operation activated by the user and in particular it refers to one or the other of cell discharge or cell charge, whichever is caused to occur, by the user, first. In other words, incidental self-discharge (e.g., on storage) does not qualify herein or in the claims as an initial cell operation.

Moreover, because it can be difficult to identify the precise chemical nature of the various active sulfur species existing in the catholyte solution, the composition of the active species in the catholyte (i.e., active catholyte composition) is sometimes expressed herein, and in the claims, in terms of an "active lithium sulfur stoichiometric ratio" or more simply an "active stoichiometric ratio" which is the ratio of active sulfur to active lithium dissolved in the electrolyte, and represented by the general formula $Li_2S_x$. Furthermore, it should be understood that the "active stoichiometric ratio" as used herein is exclusive of any non-active lithium salts and/or non-active sulfur salts that may be added to the electrolyte for any purpose, including, e.g., to enhance lithium ion conductivity in the case of, e.g., a non-active LiCl salt, or a non-active sulfur containing salt such as, e.g., $LiSO_3CF_3$.

Accordingly, in various embodiments, the active lithium sulfur stoichiometric ratio in the catholyte prior to, in particular just prior to, initial cell operation is $Li_2S$; $Li_2S_x$ (x>1); $Li_2S_x$ (1<x≤5); $Li_2S_x$ (4<x<5); $Li_2S_x$ (3<x<4); $Li_2S_x$ (2<x<3); $Li_2S_2$; $Li_2S_3$; $Li_2S_4$; $Li_2S_5$; or $Li_2S_x$ (x>5), and the concentration of the dissolved active sulfur species is typically significant, e.g., greater than 1 molar sulfur. For instance, in particular embodiments, especially for cells using a lithium metal or lithium alloy as the electroactive anode material, the active stoichiometric ratio just prior to initial cell operation is $Li_2S_x$ with the following range for x: 2≤x≤5, and the active sulfur concentration is between 10 to 17 molar sulfur. For example, a catholyte composition having an active stoichiometric ratio of about $Li_2S_4$, and at concentrations greater than 10 molar sulfur (e.g., 11, 12, 13, 14, 15, 16 or 17 molar sulfur). In another particular embodiment, especially useful for cells which are fabricated in the fully or mostly discharged state (e.g., having an anode electroactive material that is devoid of active lithium), the active stoichiometric ratio of the catholyte just prior to initial cell operation is $Li_2S$, and the active sulfur concentration is typically greater than 1 molar sulfur, and preferably greater than 2 molar sulfur, and more preferably greater than 3 molar sulfur (e.g., 3 molar, 4 molar, or 5 molar sulfur).

Another advantage of the aqueous catholyte is that it may serve as a medium into which high concentrations of fully or partially reduced active sulfur species (e.g., $Li_2S$) may be quickly dissolved during charge. In this way, high capacity cells in accordance with embodiments of the instant disclosure may be deeply discharged repeatedly since the cell reaction product on discharge (e.g., $Li_2S$) is readily dissolved and therefore more readily oxidized on charge. Thus, in various embodiments, the cell is formulated and operated such that a significant portion of the sulfur ampere-hour capacity, at the end of discharge, is present in the form of solid phase lithium sulfide.

Furthermore, the combination of high solubility and fast dissolution kinetics of $Li_2S$ in water also enables a practical method of making an aqueous lithium sulfur cell that is assembled in the fully discharged state, and which makes use of alternative anode electroactive materials that are different than that of lithium metal, such as carbon intercalation materials, metals, semi-metals, intermetallics and alloys thereof (e.g., silicon) capable of reversibly inserting (e.g., alloying) and de-inserting (de-alloying) lithium and combinations thereof such as carbon silicon composites. For example, one method in accordance with the present disclosure involves: i) providing an anode devoid of active lithium (e.g., a carbon intercalation anode) in the fully discharged state (i.e., entirely un-intercalated); ii) providing an aqueous sulfur catholyte comprising water and dissolved lithium sulfide; iii) providing a cathode comprising an electron transfer medium for electrochemical oxidation of dissolved lithium sulfide; iv) configuring the anode, catholyte and cathode into a battery cell; and iv) charging the battery cell. Accordingly, in various embodiments the instant cell comprises both dissolved lithium sulfide and a significant amount of solid phase lithium sulfide in contact with the aqueous electrolyte. For instance, in various embodiments the molar quantity of active sulfur as solid phase lithium sulfide is greater than that of active sulfur dissolved in the electrolyte by a factor of at least 2, or at least 3, or at least 5 or at least 10. Moreover, in the same or separate embodiments, the full charge capacity of the cell just prior to initial cell operation is derived from the ampere-hour capacity of dissolved active sulfur species in the catholyte combined with the ampere-hour capacity of solid phase lithium sulfide. Furthermore, in the same or separate embodiments upon cell fabrication and just prior to initial cell operation the anode electroactive material is substantially devoid of active lithium, and the initial cell operation is to charge the battery. For example, the anode electroactive material may be an intercalation material capable of electrochemically intercalating lithium upon electro-reduction in the presence of lithium ions, or an alloying material capable of electrochemically alloying with lithium upon electro-reduction in the presence of lithium ions, or a material capable of forming a lithium inter-metallic phase upon electro-reduction in the presence of lithium ions. For example, in particular embodiments the anode electroactive material is an intercalating carbon, silicon, or a composite of said silicon and carbon.

In applications where high pulse power and size are paramount performance benefit may be gained by taking advantage of the facile electro-kinetics of solution phase redox in combination with the high solubility of polysulfide species in water. For instance, in various embodiments, the cell is formulated and operated such that the ampere-hour capacity in the cell, at full state of charge, is solely present as dissolved active sulfur species in the catholyte. In particular the cell may be fabricated in the fully charged state devoid of solid phase active sulfur (e.g., devoid of elemental sulfur).

The use of water and protic N-compounds as a catholyte solvent clearly provides considerable benefit, but it also presents significant challenges in a lithium-sulfur battery. In particular, the use of water is constrained by its reactivity with electroactive lithium materials (e.g., lithium metal). Accordingly, the present disclosure makes use of lithium anode structures wherein the electroactive lithium is isolated from contacting the aqueous sulfur catholyte. In various embodiments, a protected lithium electrode is employed which contains a lithium electroactive material protected from the external environment by a substantially impervious lithium ion conductive protective membrane architecture. Thus in accordance with this aspect of this disclosure, the aqueous catholyte is disposed in the cell such that it directly contacts the electron transfer medium but does not contact the electroactive material of the anode (e.g., lithium metal or carbon intercalation material).

A further challenge to the use of water in a lithium-sulfur cell is the hydrolysis of dissolved lithium sulfide ($Li_2S$) in the catholyte and the resulting generation of hydrogen sulfide ($H_2S$). According to some embodiments of the present disclosure, a lithium-sulfur cell can comprise a housing configured to contain and withstand the pressure of such gas generation to maintain cell integrity and safety. According to further embodiments, the pH of the electrolyte (catholyte) can be adjusted to reduce or prevent $Li_2S$ hydrolysis. This is particularly achieved with basic pHs, for example greater than 7, or from about 9 to 12 and up to 14. However, the disclosure is not limited to basic electrolytes, and it is contemplated herein that the pH may be adjusted to values below pH 7 (i.e., acidic) or about pH 7 (i.e., neutral catholyte) using acidic salts and buffering agents.

Further relating to suitable electrolyte/catholyte formulations in accordance with the present disclosure, compositions and methods are provided to enhance contact between the aqueous electrolyte and the cathode electron transfer medium, for example an electronically conductive matrix such as a carbon or metal mesh, foam or other high surface area, typically porous, structure. Such improved contact enhances utlilization and rate performance of the cell. Electrolyte/catholyte compositions in this regard can include a surfactant to wet the catholyte to the conductive matrix. Also or alternatively, the matrix can be surface treated prior to contact with the electrolyte to enhance wetting, for example being soaked in a wetting agent, followed by displacement of the wetting agent with the aqueous catholyte solution of polysulfides. Still further in this regard, the catholyte may include dissolved organosulfur as a cathode active material. The organosulfur compound or compounds can self-wet to the cathode electron transfer matrix.

Another aspect of the present disclosure relates to the cathode structure.

While the disclosure has generally been made with reference to embodiments having electroactive catholyte (i.e., a catholyte containing dissolved active sulfur species) and/or electroactive fully reduced solid phase lithium sulfide loaded in the cathode, the disclosure is not limited as such, and embodiments are contemplated herein that have fully oxidized solid phase electroactive sulfur (e.g., elemental sulfur) or active organosulfur compounds incorporated in the cell during fabrication as an exclusive source of active sulfur or in combination with an electroactive sulfur catholyte. Notwithstanding the aforementioned sulfur containing cathode configurations, in various embodiments the cell is fabricated absent elemental sulfur, and the cathode is, thereby, devoid of elemental sulfur just prior to initial cell operation.

The disclosure also relates to methods of manufacture of aqueous lithium-sulfur battery cells. In one aspect, such a method involves loading the cathode with lithium sulfide, particularly in the form of $Li_2S$. In various embodiments the methods include one or more of cryogenics, sublimation drying, techniques to mitigate formation of lithium hydroxide hydrates, and mechanical loading of lithium sulfide particles (e.g., $Li_2S$ powder).

In various embodiments the instant cells are self-contained and sealed in a hermetic casing wherein the entirety of the cell capacity is derived from electroactive sulfur and electroactive lithium disposed in the casing during cell manufacture. These fully sealed cells may be of the primary or secondary type.

In other embodiments the instant cells are configured in a battery flow cell system, wherein an aqueous sulfur catholyte is caused to flow, and/or circulate, into the cell, and, in various embodiments, through an inter-electrode region between the lithium anode and the cathode electron transfer medium. In some embodiments both the aqueous catholyte and the electroactive lithium are flowable and during operation are caused to flow through the cell.

In another aspect the disclosure provides an electrochemical device component comprising the aforesaid aqueous lithium sulfur battery cell and an electronic component that interfaces with the battery cell to monitor cell voltage and/or the amount of electrical charge passed during cell discharge, and is further programmed to prevent battery overdischarge and/or overcharge.

In another aspect the disclosure provides methods of operating a battery cell.

In various embodiments these methods include programming the electronic component to prevent the aqueous lithium sulfur battery cell from overdischarging to a voltage at which molecular hydrogen would evolve from the cathode, and/or programming the electronic component to prevent the aqueous lithium sulfur battery cell from overcharging to a voltage at which oxysulfur compounds will form.

It should be understood that aqueous lithium-sulfur battery cells in accordance with the present disclosure are not merely different from conventional non-aqueous Li—S battery cells by their substitution of a non-aqueous electrolyte solvent with an aqueous electrolyte solvent system. The use of water in the electrolyte can result in a solvent system that is not just a spectator, but actually participates in the electrochemical reactions at the cathode, reacting to form and dissolve new species. Described herein therefore is an entirely new class of battery cells having entirely different chemistry than conventional Li—S battery cells (as evidenced by the dramatic difference in their voltage profiles), and to the formulation, engineering, operation and manufacturing challenges associated therewith.

These and other aspects of the present disclosure are described in more detail, including with reference to figures, in the description which follows.

DETAILED DESCRIPTION OF SPECIFIC EMBODIMENTS

Reference will now be made in detail to specific embodiments of the disclosure. Examples of the specific embodiments are illustrated in the accompanying drawings. While the disclosure will be made in conjunction with these specific embodiments, it will be understood that it is not intended to limit the disclosure to such specific embodiments. On the contrary, it is intended to cover alternatives, modifications, and equivalents as may be included within the spirit and scope of the disclosure. In the following description, numerous specific details are set forth in order to provide a thorough understanding of the present disclosure. Embodiments of the present disclosure may be practiced without some or all of these specific details. In other instances, well known process operations have not been described in detail so as to not unnecessarily obscure the present disclosure.

Figure 1:
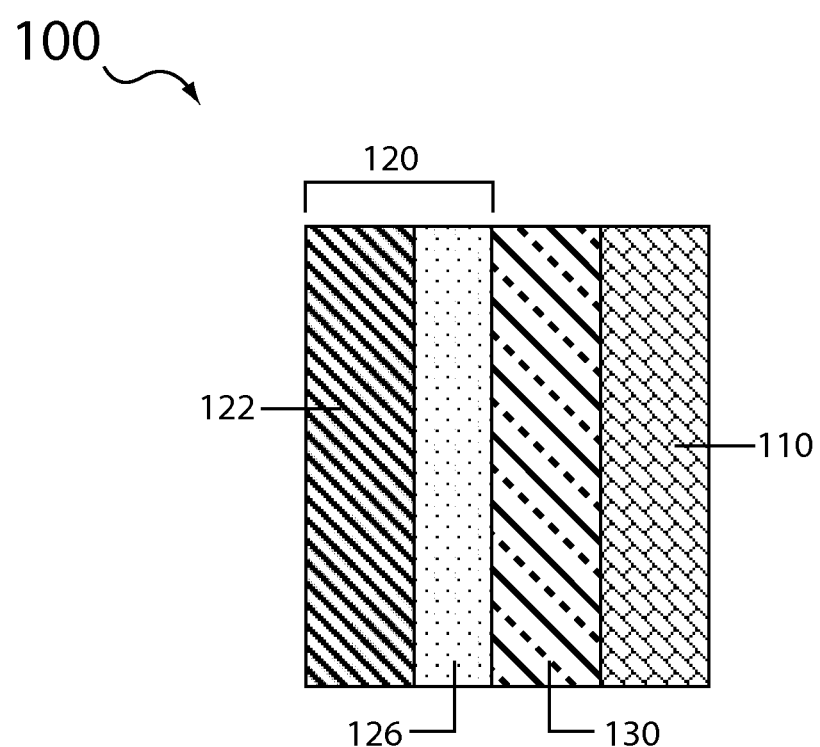
FIG. 1 is a schematic cross section of a battery cell in accordance with various embodiments of the present disclosure.

A lithium sulfur cell in accordance with various embodiments of the instant disclosure is shown in FIG. 1. The cell 100 includes a cathode 110 comprising an electron transfer medium, a protected lithium anode 120, an aqueous electrolyte in contact with the electron transfer medium and in various embodiments also in contact with an exterior surface of the protected lithium anode, and active sulfur species in contact with the aqueous electrolyte (e.g., lithium polysulfides, lithium sulfide, lithium hydrosulfide, dissolved therein and/or present in the solid phase (e.g., solid phase $Li_2S$).

The protected lithium anode 120 includes a lithium electroactive material layer 122 and a substantially impervious lithium ion conducting protective membrane architecture 126 on the surface of the lithium active layer 122. The membrane architecture is substantially impervious to water and has a first surface chemically compatible in contact with the lithium electroactive layer and a second surface, opposing the cathode, which is chemically compatible in contact with water, and in particular chemically compatible in contact with the catholyte employed in the cell. In some embodiments the cell further includes a porous separator material layer 130 interposed between the cathode and the protected anode, and containing in its pores at least a portion of the aqueous electrolyte (i.e., aqueous catholyte). In other embodiments the cell is absent a separator and it is contemplated herein that the membrane architecture second surface directly contacts the cathode, which, in said embodiments, is generally porous with catholyte filling the pore spaces.

Figure 2A:
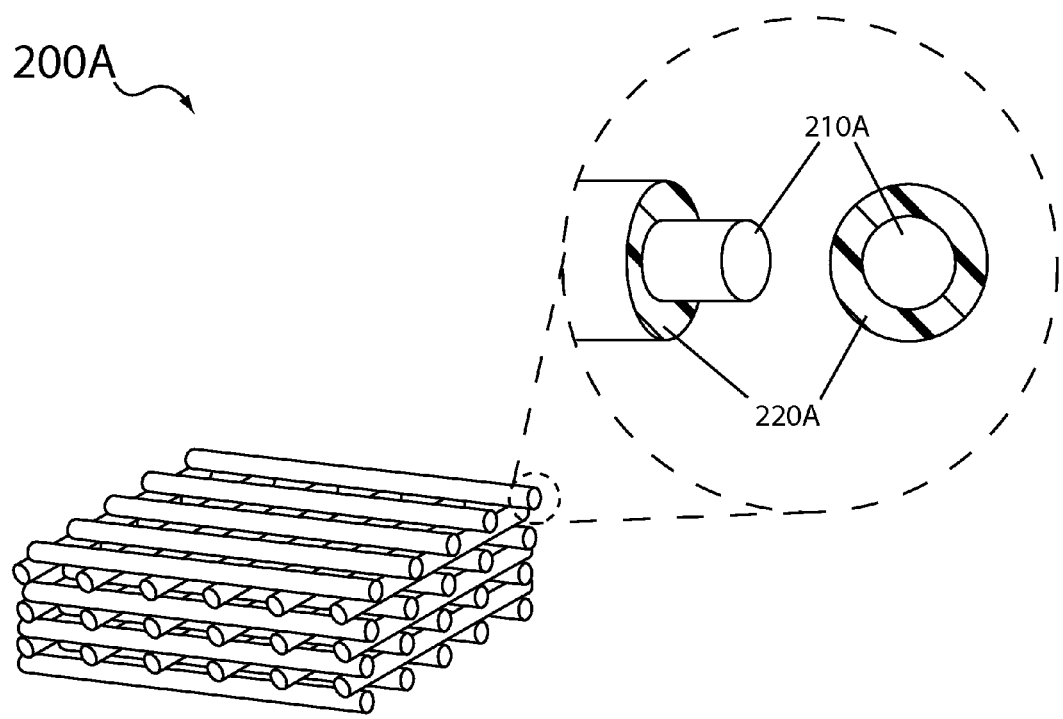
FIGS. 2A-B illustrates an electron transfer medium in accordance with various embodiments of the present disclosure.
Figure 2B:
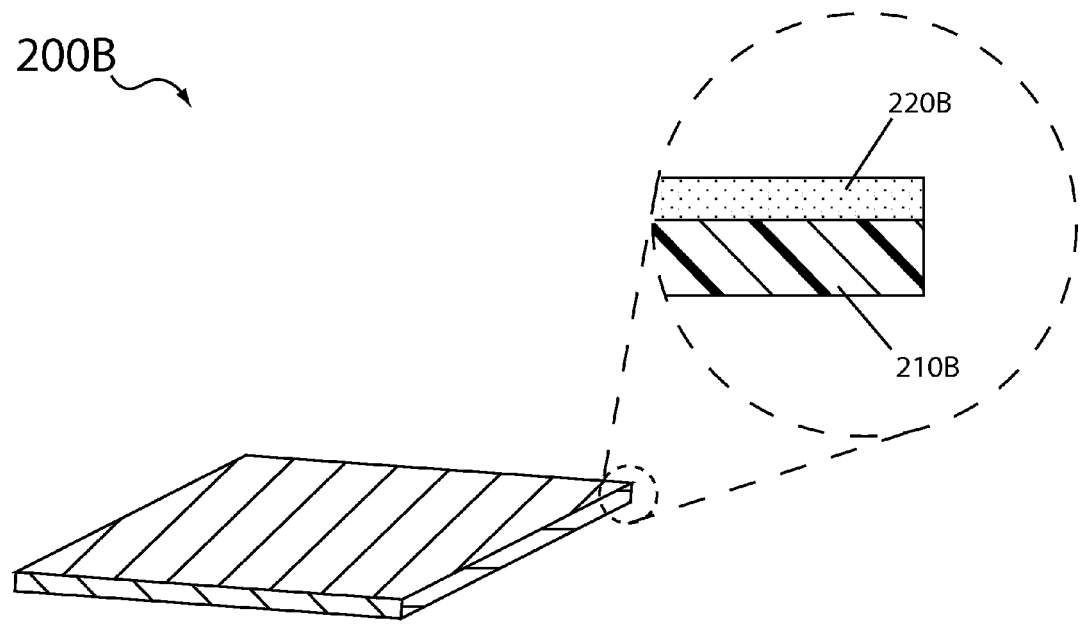

The cathode 110 includes a solid electron transfer medium having an "exterior surface" that is chemically compatible in contact with the catholyte and on which dissolved active sulfur species are electro-reduced during cell discharge and electro-oxidized on charge. With reference to FIGS. 2A-B, in various embodiments the electron transfer medium 200A/200B may be a porous three-dimensional structure 200A or planar 200B and substantially dense or otherwise porous (e.g., a planar mesh). Whether dense or porous, the medium should be sufficiently electronically conductive to support the electrical current through the cell and its exterior surface capable of supporting the electron transfer current. When porous, the solid electron transfer medium may take the form of a porous matrix such as a woven or non-woven fiber network (e.g., a metal or carbon fiber cloth or paper) or a through porous monolithic solid body (e.g., a metal or carbon foam). When planar, the medium may simply be a metal or carbonaceous sheet or foil or open mesh of sufficient thickness and conductivity to be self-supporting, or the planar medium may be a composite having a first layer, typically thin and electronically conductive, that defines the exterior surface and a second layer serving as a substrate support, and optionally further providing current collection when electronically conductive.

The electron transfer medium has an exterior surface that may be porous or dense but is defined, at least in part, by a material that, in contact with the catholyte, facilitates electron transfer, and, in particular, facilitates electrochemical redox of active sulfur species. Continuing with reference to FIGS. 2A-B, in various embodiments the electron transfer medium 200A/200B is a porous matrix composed of a core component (i.e., underlying matrix structure) 210A/210B having an exterior layer component 220A/220B that provides the exterior surface in contact with the catholyte. The core component generally provides substrate support and may, when conductive, facilitate current collection, whereas a primary function of the exterior layer is to provide some benefit to the electrochemical performance, and in particular that pertaining to electron transfer (e.g., facilitating sulfur redox, suppressing water decomposition, or both). The exterior layer may be porous or dense. In various embodiments, a dense exterior layer is also preferably contiguous and therefore substantially covers the core surface in its entirety. In other embodiments, a porous exterior layer is suitable, especially when the surface composition of the core is compatible with the catholyte and does not catalyze hydrogen evolution, as described in more detail below. Furthermore, when porous or dense, the exterior layer may include high surface area particles that electro-catalyze sulfur redox and/or increases the effective surface area for electrical benefit.

In some embodiments the core, electronically conductive, supports current collection, while the exterior layer primarily serves to support and preferably enhance electrochemical sulfur redox. Suitable electronically conductive core materials include metals, preferably of lightweight (e.g., aluminum). In other embodiments the core is electronically insulating and the exterior layer provides electron transfer and is sufficiently conductive so that it may provide some or all of the current collector function. The insulating core may be composed of any suitable insulating material of sufficient mechanical integrity and is preferably although not necessarily chemically compatible in contact with the catholyte. Suitable insulating core materials include, but are not limited to, glasses and polymers. In certain embodiments the exterior layer is dense and substantially free of defects that otherwise would allow water from the electrolyte to seep into contact with the core material, and potentially reduce its strength or mechanical integrity. To prevent this from happening, in preferred embodiments the core material is also chemically compatible in contact with the catholyte and even more preferably is a material that does not swell or lose mechanical strength when in contact with water, and specifically does not mechanically degrade or change shape if exposed to the active electrolyte. In various embodiments additional layers may be incorporated between the insulating or conductive core and the exterior layer to support current collection and/or provide or improve interface compatibility and/or adhesion. For example, the insulating core of an underlying matrix structure may have a first metal coating (e.g., aluminum) serving as an intermediary layer to provide current collection and a second coating covering the aluminum that defines, in whole or in part, the exterior surface for the purpose of facilitating sulfur redox.

The electron transfer medium may be uncatalyzed, relying solely on the medium material (e.g., carbon) to facilitate the electrochemical redox reactions, or, in some embodiments, the electron transfer medium may contain a catalyst on its surface, such as a particulate catalyst or the catalyst may be formed on the underlying carbon or metal matrix as a coating. In some embodiments the exterior layer is a porous high surface area film composed of electronically conductive particles (e.g., high surface area carbons including nano-carbons, carbon blacks and functionalized carbons) that preferably electro-catalyze at least one or both of electro-reduction and electro-oxidation of active sulfur. In other embodiments, as described in more detail below, the exterior layer may be a dense, preferably thin, electronically conductive layer, such as a thin dense film of a metal, metal alloy, or metal compound (e.g., a metal sulfide) for the purposes of providing one or more of electronic conduction, facilitation of sulfur redox, and expansion of the voltage stability window of the catholyte, as described in more detail below.

Figure 3:
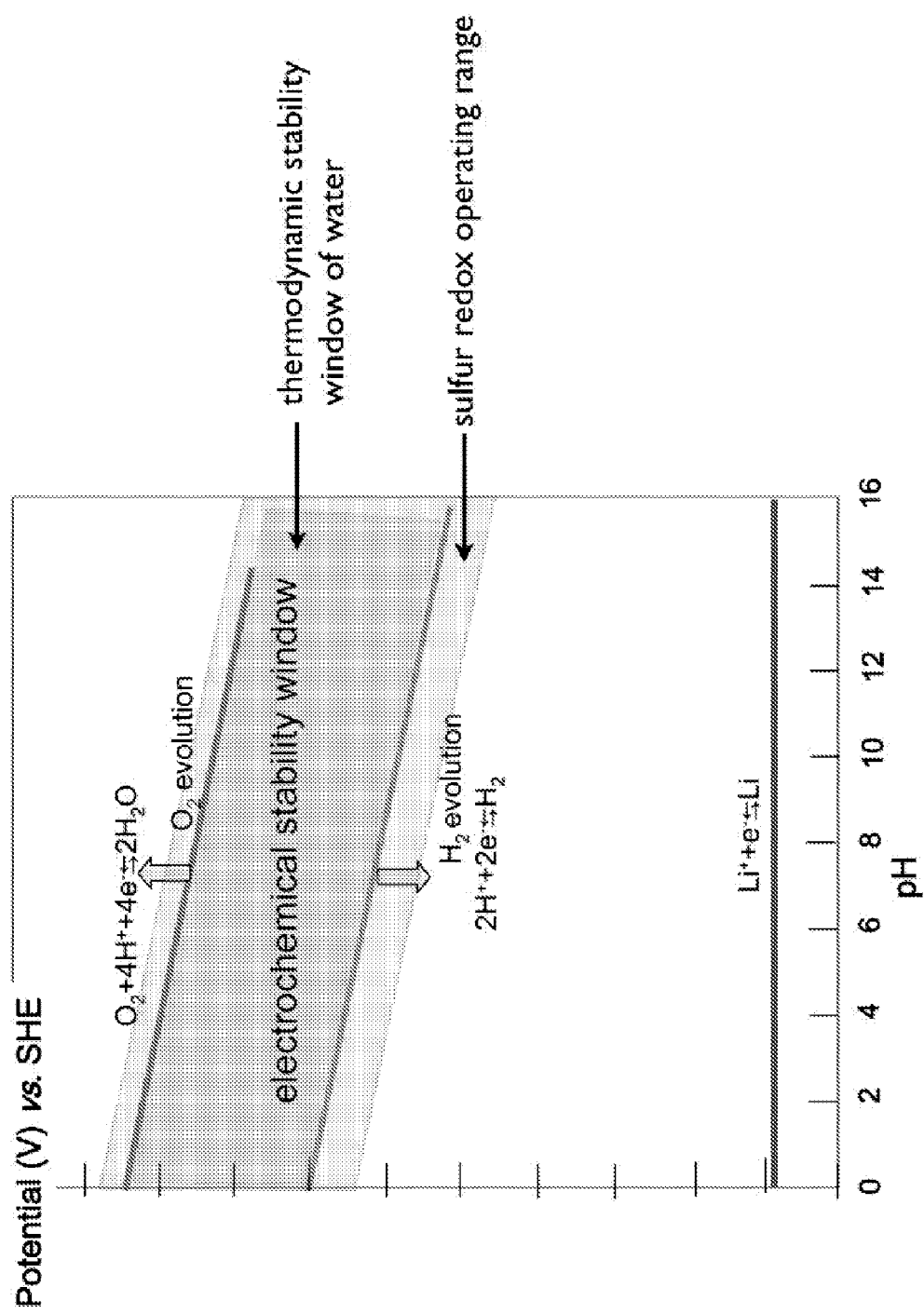
FIG. 3 is a qualitative illustration of a Pourbaix diagram for water and active sulfur species in catholyte in accordance with the present disclosure.

With regard to the voltage window of the catholyte, a significant issue may arise during discharge once the cell voltage drops below a "critical voltage" corresponding to the thermodynamic potential for water reduction, as the cell electrochemistry is made complicated by the potentiality of water decomposition, and in particular $H_2$ evolution. The issue is illustrated pictorially with reference to FIG. 3, showing a Pourbaix diagram of water compared to an illustrative Pourbaix diagram of sulfur redox without assigning voltages to the sulfur electro-reduction/oxidation reactions. As can be seen in the illustration, the critical voltage varies with pH. For instance at pH 12 the critical voltage versus lithium is about 2.3 Volts and decreases with increasing pH values, reaching about 2.2 Volts at pH 14. As illustrated, albeit quite qualitatively, at cell voltages below the voltage stability window of water (i.e., below the critical voltage) there exist significant active sulfur ampere-hour capacity; however, the practicality of harnessing that capacity is complicated by water decomposition.

In this regard, the present disclosure provides cathode structures having electron transfer mediums that enable the instant cells to be discharged to voltages beyond the thermodynamic potential for water reduction, and thereby efficiently harness the additional ampere-hour capacity which exists at cell voltages below the critical voltage, and preferably do so without evolving any $H_2$. Thus, in various embodiments the instant cells are operated having a discharge voltage cutoff (i.e., the discharge is caused to stop when the cell voltage reaches the voltage cutoff value) that approaches the critical voltage as described above, and in certain embodiments hydrogen evolution is sufficiently suppressed by the electron transfer medium to allow the value of the discharge voltage cutoff to be about that of the critical voltage, and in particular embodiments thereof, the discharge voltage cutoff is a value beyond the critical voltage (e.g., in embodiments the critical voltage may be about 2.4 Volts, 2.3 Volts, 2.2 Volts or about 2.1 Volts and the prescribed cutoff voltage is below that value; for example the voltage cutoff of the cell is about 2.3V, 2.2 Volts, 2.1 Volts, and 2.0 Volts, respectively). Accordingly, in various embodiments, the exterior surface of the electron transfer medium provides at least a dual functionality: a first function to facilitate electrochemical reduction/oxidation of the active sulfur species and a second function to inhibit hydrogen evolution. For example, the exterior surface may be defined in whole or in part by a material that facilitates sulfur redox but has a high overpotential for $H_2$ evolution (i.e., a high overpotential for the hydrogen evolution reaction (HER)). By this expedient the cell may be efficiently discharged to voltages below the critical voltage without evolving $H_2$. Preferably the exterior surface has an overpotential for the HER of at least 50 mV (the overpotential is >50 mV), and in embodiments disclosed herein the overpotential is beyond/greater than 100 mV, >200 mV, >300 mV, >400 mV, >500 mV, >600 mV, and in certain embodiments >700 mV and >800 mV. For instance, with regard to cell voltages, the use of a high overpotential electron transfer medium allows aqueous lithium sulfur cells of the instant disclosure to be discharged to cell voltages below 2.4 V, preferably below 2.3 V, even more preferably below 2.2V, below 2.1V and yet even more preferably below 2.0 V, below 1.9 V, below 1.8 V, below 1.7 V, below 1.6 V and below 1.5V.

Accordingly, in various embodiments at least a portion and in certain embodiments the entirety of the exterior surface of the electron transfer medium is defined by a material having a high overpotential for $H_2$ evolution. Suitable classes of such materials include metals, metal alloys (e.g., amalgams), and metal compounds such as metal chalcogenides, especially metal sulfides. Particularly suitable metals include lead, cadmium, indium, nickel, gallium, tellurium, manganese, and zinc, or some combination thereof. Particularly suitable metal alloys include amalgams. Particularly suitable metal sulfides include cobalt sulfide, copper sulfide, nickel sulfide, and zinc sulfide, or some combination thereof. The thickness of the exterior layer is a tradeoff between burdening the cell with extra weight and other considerations such as one or more of the composition of the core material, mechanical strength, conductivity and coating process. For instance, in embodiments the exterior layer thickness may be in the range of 50 microns to values below 1 micron (e.g., about 0.5 microns or 0.25 microns). The composition of the exterior layer (e.g., that which includes metal sulfide) may be varied across its thickness, either gradually or discretely. For example, the exterior layer may be formed in two steps, first the metal of the metal sulfide may be coated, directly or indirectly, onto the core component surface, and then the metal layer sulfidized to form a thin layer of metal sulfide, which in embodiments may be thin and dense, for example less than 10 nm, e.g., about 5 nm, about 2 nm or about 1 nm. Such thin films are also self-healing in that if a portion of the metal sulfide film were to flake off or start cracking, the underlying metal layer surface would subsequently react with sulfur in the catholyte to reform the sulfide film.

In a particular embodiment the porous electron transfer medium is composed of a core component (e.g., a glass or polymer fiber mat) and a metal sulfide exterior layer (e.g., cobalt sulfide or lead sulfide). The core component may be electronically insulating, and the metal sulfide formed by first applying a layer of the metal of the sulfide on the core (e.g., coating the core with lead) and then sulfidizing the metal coated core surface via treatment in a sulfur containing environment. Thus depending on the method of sulfidization, the exterior layer may be entirely composed of the metal sulfide (e.g., lead sulfide) or a combination of the metal (e.g., lead) and metal sulfide (e.g., lead sulfide). The metal layer may be applied using coating methods applicable for both electronically conductive and insulating core structures, as are known in the art generally, including evaporation, dip coating from the melt, electro-deposition and electro-less deposition. Alternatively, the core component may itself be composed of a material with a high overpotential for $H_2$ (e.g., a porous lead or porous cobalt matrix). However, the use of a heavy metal core material may unduly burden the overall cell weight, so in preferred embodiments the core material is composed of a material of light weight and preferably low density, such as carbon (e.g., graphitic like fibers or carbon foams), light weight metals such as aluminum, or inorganic materials such as silica or other glasses, or organic materials such as polymers (e.g., polymer fibers) which preferably are not swelled by water (e.g., the polymer core composed of polypropylene, polyethylene, or a combination thereof). Hollow cores are also contemplated herein for providing an exceptional lightweight advantage. Carbon is a particularly useful core material as it can be fabricated into a number of porous formats including porous fiber matrices and foams, and is also electronically conductive and thus capable of supporting current collection, which enables the use of exceptionally thin exterior layers. For example, less than 5 micron thick, preferably less than 1 micron, and even more preferably less than 0.5 micron, and yet even more preferably the thickness of the exterior layer is less than 0.25 microns. In the same or separate embodiments, especially when the core is electronically insulating, an intermediate electronically conductive layer, such as a metal, semi-metal, or metal compound, (e.g., an aluminum layer) may be applied as a coating between the core and the exterior layer to provide current collection support, or the exterior layer itself may be of sufficient thickness to support the electrical current. For instance an intermediate metal layer such as aluminum having thickness between 0.25 microns and 10 microns, and more preferably between 0.5 microns and 5 microns; for example, about 0.5 microns, about 1 micron, about 2 microns, about 3 microns, about 4 microns, and about 5 microns. Thereafter the exterior layer applied to the surface of the intermediary layer using one or more of the aforementioned coating techniques, or other coating techniques generally known in the arts.

In various embodiments, the composition of the exterior surface may be modified via surface treatments, and in particular, sulfidization to form a sulfide composition suitable for supporting, and preferably, electro-catalyzing sulfur redox. The step of sulfidization may be carried out in-situ within the cell by using a sulfur based catholyte. And while in-situ processing has the clear advantage of simplicity, it also leads to a concomitant loss in active sulfur cell capacity, since at least some of the sulfur that would have otherwise provided cell capacity is consumed by the sulfidization treatment, and for high surface area porous matrix structures, the loss of active sulfur capacity can be significant. Accordingly, in preferred embodiments, especially useful for sulfidizing porous matrix structures but not limited as such and thus also includes sulfidizing planar and/or dense core structures, the sulfidization step is carried out ex-situ in a sulfur environment remote from the cell. For instance, the core material composed of the metal of the metal sulfide, or a core component coated with said metal may be placed in a bath of an aqueous lithium polysulfide solution similar to or identical in nature to the catholyte utilized in the cell, and allowed to stand in the bath for a time sufficient to form a suitable metal sulfide film, and preferably one which is substantially dense and pore free.

Continuing with reference to FIG. 1 the cathode 110 may be assembled in the cell devoid of elemental solid sulfur, and the entirety of the sulfur capacity loaded into the cell via the catholyte in the form of dissolved active sulfur species or via solid phase active sulfur species such as typically $Li_2S$ or some combination of dissolved active sulfur (e.g., dissolved $Li_2S$) and solid phase $Li_2S$. Alternatively, the cathode may include some form of solid elemental sulfur, including crystalline sulfur, amorphous sulfur, precipitated sulfur, and sulfur solidified from the melt. Elemental sulfur includes the various polyatomic molecules of sulfur, especially the octasulfur allotrope characterized as cyclo-$S_8$ ring, and polymorphs thereof such as α-octasulfur, β-octasulfur, and γ-octasulfur. For example, elemental sulfur (in the form of sulfur particulates including nano-sized sulfur particles) may be incorporated in the cell as a material component of the cathode, wherein, e.g., the sulfur may be admixed with high surface area or activated carbon particles and an appropriate binder (PTFE, PvDF and PEO) for adhering the material components in a suitable liquid carrier for formulating a slurry to be coated onto or impregnated into the porous matrix structure. Slurry formulations, with or without solid elemental sulfur, and coating methods suitable for use herein for incorporating solid phase active sulfur into the cathode are described in U.S. Pat. Nos. 6,030,720, 6,200,704, and 6,991,662, each of which is hereby fully incorporated by reference for all that they describe, and in particular for the slurry formulations and coating methods described. In the same or separate embodiments the active sulfur in the cathode may be or further include electroactive organosulfur compounds, including those described in U.S. Pat. Nos. 4,833,048; 4,917,974; 5,162,175; 5,516,598, hereby fully incorporated by reference, in particular for their disclosure relating to organosulfur compound composition and use.

In alternative embodiments, the cells may be assembled having all of the sulfur capacity loaded in the cathode, e.g., in the form of elemental sulfur. In other embodiments, sulfur is present in the cathode as a solid phase electroactive material as well as in the aqueous catholyte in the form of dissolved polysulfide species. In some embodiments the cell is assembled using a cathode that is loaded with solid phase $Li_2S$, and by this expedient, the cell may be assembled in the fully or partially discharged state, wherein all or a portion of the active lithium is stored in or nearby the cathode during cell assembly. The as assembled cell is then subsequently charged, e.g., to full charge capacity, prior to initial discharge. Embodiments in accordance with this aspect of the instant disclosure are described in further detail below, and in particular in the section entitled Aqueous Lithium Sulfur Cells Assembled in the Discharged State.

In various embodiments a significant amount of the lithium and sulfur capacity is present in the cell prior to initial cell operation, and is in the form of a fully or highly reduced solid lithium sulfur material; for instance, in the form of solid phase $Li_2S$. The solid phase $Li_2S$ loaded typically in contact with the catholyte such that concomitant with cell charging solid phase lithium sulfide will dissolve into the catholyte. In embodiments the amount of solid phase lithium sulfide present in the cell prior to initial cell operation is of an amount which provides more active sulfur than that already dissolved in the catholyte. For instance, the following embodiments are contemplated wherein the weight of water in the catholyte relative to the weight of active solid phase lithium sulfide (e.g., $Li_2S$) pre-loaded in the cell corresponds to the following ratio (R): $R \leq 10$, $R \leq 6$, $R \leq 5$, $R \leq 4$, $R \leq 3$, $R \leq 2$ and $R \leq 1.5$. In particular embodiments, the cell is fabricated with said ratio in accordance with the following ranges: $[1.15 \leq R < 1.7]$; $[1.7 \leq R < 2.3]$; $[2.3 \leq R < 2.9]$; $[2.9 \leq R < 3.5]$; $[3.5 \leq R < 4.0]$; $[4.0 \leq R < 5.0]$; $[5.0 \leq R < 7.0]$; and $[7.0 \leq R < 10.0]$.

In various embodiments the porous cathode has a bimodal pore size distribution.

For instance, the first fraction of pores are macropores (radii >100 nm), preferably large marcropores (radii >1 um), making up 70%-75%-80%-85%-90% of the total cathode porous volume; and the second fraction consists of micropores (radii <1 nm) or small mesopores (radii between 1 nm and 10 nm), making up most or all of the remaining porous volume.

In a particular embodiment activated carbon cloth may be used as a cathode component, and the spaces between carbon fibers constitute the first porous fraction while the pores on the surface of the fibers constitute the second porous fraction.

In another particular embodiment, mesoporous carbon black may be deposited onto a porous carbon substrate (cloth, paper etc.), where spaces between carbon fibers constitute the first porous fraction and pores in the carbon black constitute the second porous fraction.

In various embodiments the bimodal cathode is loaded with liquid catholyte and the cells are built in the charged state.

In a particular embodiment the bimodal porous cathode is loaded with liquid catholyte containing long chain polysulfides $Li_2S_n$ (where n=>4). The first porous fraction maximizes cathode loading with sulfur-containing catholyte and provides the volume for accommodation of solid discharge product $Li_2S$, and the second porous fraction provides sufficient surface area for the electrochemical reactions.

In various embodiments the cathode may be loaded with solid discharge product $Li_2S$ (i.e., the cells are built in a discharged state).

In a particular embodiment, the Li—S cell, assembled in a discharged state, and includes a carbon anode typically devoid of lithium (or other anode electroactive material devoid of active lithium) and a porous cathode loaded with solid $Li_2S$. To compensate for irreversible Li loss during the initial intercalation/de-intercalation cycles of the carbon anode, the liquid catholyte has an excess of Li, which can be in the form of a soluble Li compound, such as LiOH, LiCl, $LiNO_3$ or the like. The first porous fraction of the cathode maximizes cathode loading with solid $Li_2S$ and $Li_2S_n$-containing catholyte. And the second porous fraction provides sufficient surface area for electrochemical reactions.

In various embodiments the cathode surface is pre-treated to improve wetting with catholyte and reduce amount of consumed sulfur. For instance, prior to cell assembly, the porous cathode is filled with $Li_2S_n$ solution and then washed with water. The treatment causes a reaction between the sulfur of the pre-treating solution and the cathode surface. By this expedient, active sulfur in the battery cell is not consumed by reactions with surface groups on the carbon cathode during cell cycling.

In one aspect the present disclosure provides methods for loading a porous cathode with solid $Li_2S$. Preferably the $Li_2S$ is loaded in the first porous fraction where it is thermodynamically favorable.

In various embodiments a cryogenic method involving water extraction is used to load the cathode with solid $Li_2S$. For instance, a porous carbon cathode is soaked in hot saturated solution of $Li_2S$ in water. In order to increase solubility of $Li_2S$ and prevent the loss of $H_2S$ due to hydrolysis this operation is preferably performed in a closed vessel. The carbon material is cooled down below the cryohydrate point of the $Li_2S$—$H_2O$ system. As a result, the solution decomposes into two solid phases: $Li_2S$ and ice. At the next step, water is extracted with a solvent, which: is miscible with water; doesn't react with or dissolve $Li_2S$, LiOH, and $H_2S$, at least at low temperatures; has a melting point below the cryohydrate point of $Li_2S$—$H_2O$ system (e.g., <−40-−50° C.); can be easily removed by evaporation. Among the promising solvents are Methanol (m.p. −97° C.), Acetone (m.p. −93° C.), and Tetrahydrofuran (m.p. −108° C.). Finally, the carbon cathode is rinsed with neat solvent to wash out traces of water and then the solvent is removed in vacuum or in a dry and oxygen-free atmosphere.

In various embodiments a Sublimation drying process is used to load $Li_2S$ into the cathode, and preferably into the first porous fraction. For instance, a porous carbon cathode may be soaked in hot saturated solution of $Li_2S$ in water and then cooled down and frozen as described above. The cathode is then filled with a frozen material that is placed into a cooled vacuum chamber so water can evaporate under deep vacuum directly from the solid state without melting. During sublimation, the frozen material should stay at a temperature below the cryohydrate point of the $Li_2S$—$H_2O$ system. The end result is a dry porous carbon matrix filled with solid $Li_2S$.

In various embodiments the drying is caused to take place in an atmosphere that prevents formation of LiOH hydrates. For instance, the porous carbon cathode may be soaked in hot saturated solution of $Li_2S$ in water. Drying of $Li_2S$ located in the pores of carbon either with the use of vacuum or at elevated temperature is complicated, since formed $H_2S$ gas is more volatile than water vapor and therefore leaves the system first. This results in an excess of LiOH in the system. LiOH is known to form mono- and tri-hydrate crystals and in this way the system will retain water. To eliminate $H_2S$ loss, drying is performed in a closed vessel filled with $H_2S$ gas in the presence of agents that strongly absorb water vapor, but do not interact with $H_2S$. (Examples are $P_2O_5$, $H_2SO_4$, $Mg(ClO_4)_2$, $CaCl_2$). The drying process can be performed at or below atmospheric pressure and at or above room temperature.

In various embodiments $Li_2S$ is loaded into the cell using mechanical loading of dry $Li_2S$ powder into a porous matrix that may serve as a cathode or otherwise does not have cathode properties (i.e., sulfur redox does not take place on the porous matrix). For instance, carbon porous matrix may be used for $Li_2S$ loading and should be thicker than the required cathode thickness and also should have a high total porosity (more than 60%, more than 75%, more than 90%, more than 95%) and a large fractions of macropores and/or large mesopores. The loading is done in a dry, oxygen-free atmosphere. The carbon matrix is agitated during $Li_2S$ powder loading to fill a larger fraction of porous space. After the excess of $Li_2S$ powder is removed, the matrix can be compressed to achieve the target cathode thickness.

In a particular embodiment, a second carbon porous layer may be incorporated in the cell, with both pore size distribution and carbon surface chemistry optimized for use in aqueous Li—S cells. This second carbon porous layer is placed in direct contact with a $Li_2S$ layer or a matrix loaded with $Li_2S$ powder.

In another embodiment, a porous matrix for $Li_2S$ powder loading is fabricated from a metal, in particular, from stainless steel. In another embodiment, the porous matrix is fabricated from polymeric materials, for instance PP and PE. In one particular embodiment, dry $Li_2S$ powder is pressed into pellets or thin layers that are placed in the cathode compartment in contact with carbon porous layer. In one embodiment, $Li_2S$ powder is mixed with binders prior to the pressing operation. In another embodiment, the $Li_2S$ is mixed with inert inorganic powders, such as silica, alumina, etc. prior to the pressing operation. Conductive fillers, such as short carbon fibers and carbon powders, also can be used.

In various embodiments, the amount of $Li_2S$ loaded into the cell as a solid is significantly larger than the amount of $Li_2S$ in the dissolved (hydrolyzed) form present in the electrolyte.

In another embodiment, dry Li2S may be coated or pressed directly onto a cathode current collector (metal, in particular SS ExMet, screen, or the like)

Aqueous Sulfur Catholyte

In accordance with aspects of this disclosure, the aqueous catholyte contains a significant amount of water (i.e., not merely a trace amount), and the catholyte is disposed in the cell such that it directly contacts the cathode. In certain embodiments water serves as the main liquid solvent of the sulfur catholyte (i.e., electrolyte in contact with the sulfur cathode), and in particular embodiments water and an N-solvent are the only catholyte solvent. In some embodiments the N-solvent is the main solvent.

In accordance with this aspect of the disclosure, a significant (non-trace) amount of water is incorporated in the catholyte. In various embodiments the volume percent of water in the catholyte relative to the total liquid solvent volume is greater than 5%, 10%, 20%, 30%, 40%, 50%, 60%, 70%, 80%, and greater than 90%. In certain embodiments water and the N-solvent are the only liquid solvent in the catholyte (i.e., water and the N-solvent constitutes 100% of the solvent volume of the catholyte). In various embodiments water is the main solvent in the catholyte.

Water has unique properties. In aqueous sulfur catholyte solutions, water chemically interacts with the active sulfur species to provide a number of benefits. In various embodiments the water serves as a medium into which a large concentration of active sulfur species may be dissolved (e.g., including sulfide anion ($S^{2-}$), polysulfide anion ($S_x^{2-}$ with x>1), hydrosulfide anion ($HS^-$), and combinations thereof). In various embodiments, the catholyte composition just prior to initially operating the cell, which is typically the catholyte composition upon cell fabrication and sealing, includes a significant concentration of dissolved active sulfur species. For instance, an active sulfur concentration in the catholyte of greater than 0.5 molar sulfur, greater than 1 molar sulfur, greater than 2 molar sulfur, greater than 3 molar sulfur, greater than 4 molar sulfur, greater than 5 molar sulfur, greater than 6 molar sulfur, greater than 7 molar sulfur, greater than 8 molar sulfur, greater than 9 molar sulfur, greater than 10 molar sulfur, greater than 11 molar sulfur, greater than 12 molar sulfur, greater than 13 molar sulfur, greater than 14 molar sulfur, greater than 15 molar sulfur, greater than 16 molar sulfur or greater than 17 molar sulfur may be used.

Moreover, because it can be difficult to identify the precise chemical nature of the various active sulfur species existing in the catholyte solution at any given time during the course of discharge or charge, the composition of the active species in the catholyte is sometimes expressed herein, and in the claims, in terms of an "active stoichiometric ratio" which is the ratio of active sulfur to active lithium dissolved in the electrolyte, and that ratio is represented by the general formula $Li_2S_x$. Furthermore, it should be understood that the "active stoichiometric ratio" as used herein is exclusive of any non-active lithium salts and/or non-active sulfur salts that may be added to the electrolyte for any purpose, including, e.g., to enhance lithium ion conductivity in the case of e.g., a non-active LiCl salt, or a non-active sulfur containing salt such as, e.g., $LiSO_3CF_3$.

Accordingly, in embodiments, the catholyte, just prior to initially operating the cell, has an active stoichiometric ratio of $Li_2S$; $Li_2S_x$ (x>1); $Li_2S_x$ (1<x≤5); $Li_2S_x$ (4<x<5); $Li_2S_x$ (3<x<4); $Li_2S_x$ (2<x<3); $Li_2S_2$; $Li_2S_3$; $Li_2S_4$; $Li_2S_5$; or $Li_2S_x$ (x>5). For example, an active stoichiometric ratio of about $Li_2S$, about $Li_2S_2$, about $Li_2S_3$, about $Li_2S_4$, and about $Li_2S_5$.

In various embodiments, the lithium sulfur cells of this aspect of disclosure include an aqueous catholyte having a high concentration of dissolved active sulfur species. In embodiments, the sulfur concentration of active sulfur species in the catholyte is greater than 0.5 molar sulfur, greater than 1 molar sulfur, greater than 2 molar sulfur, greater than 3 molar sulfur, greater than 4 molar sulfur, greater than 5 molar sulfur, greater than 6 molar sulfur, greater than 7 molar sulfur, greater than 8 molar sulfur, greater than 9 molar sulfur, greater than 10 molar sulfur, greater than 11 molar sulfur, greater than 12 molar sulfur, greater than 13 molar sulfur, greater than 14 molar sulfur, greater than 15 molar sulfur, greater than 16 molar sulfur or greater than 17 molar sulfur.

In particular embodiments, the active lithium sulfur stoichiometric ratio in the catholyte just prior to initial cell operation is $Li_2S$; $Li_2S_x$ (x>1); $Li_2S_x$ (1<x≤5); $Li_2S_x$ (4<x<5); $Li_2S_x$ (3<x<4); $Li_2S_x$ (2<x<3); $Li_2S_2$; $Li_2S_3$; $Li_2S_4$; $Li_2S_5$; or $Li_2S_x$ (x>5), and the concentration of the dissolved active sulfur species is typically significant, e.g., greater than 1 molar sulfur. For instance, in particular embodiments, especially for cells using a lithium metal or lithium alloy as the electroactive anode material, the active stoichiometric ratio just prior to initial cell operation is $Li_2S_x$ with the following range for x: 2≤x≤5, and the active sulfur concentration is between 10 to 17 molar sulfur. For example, a catholyte composition having an active stoichiometric ratio of about $Li_2S_4$, and at concentrations greater than 10 molar sulfur (e.g., 11, 12, 13, 14, 15, 16 or 17 molar sulfur) may be used. In another particular embodiment, especially useful for cells which are fabricated in the fully or mostly discharged state (e.g., having an anode electroactive material that is devoid of active lithium), the active stoichiometric ratio of the catholyte just prior to initial cell operation is $Li_2S$, and the active sulfur concentration is typically greater than 1 molar sulfur, and preferably greater than 2 molar sulfur, and more preferably greater than 3 molar sulfur (e.g., 3 molar, 4 molar, or 5 molar sulfur).

Figure 4:
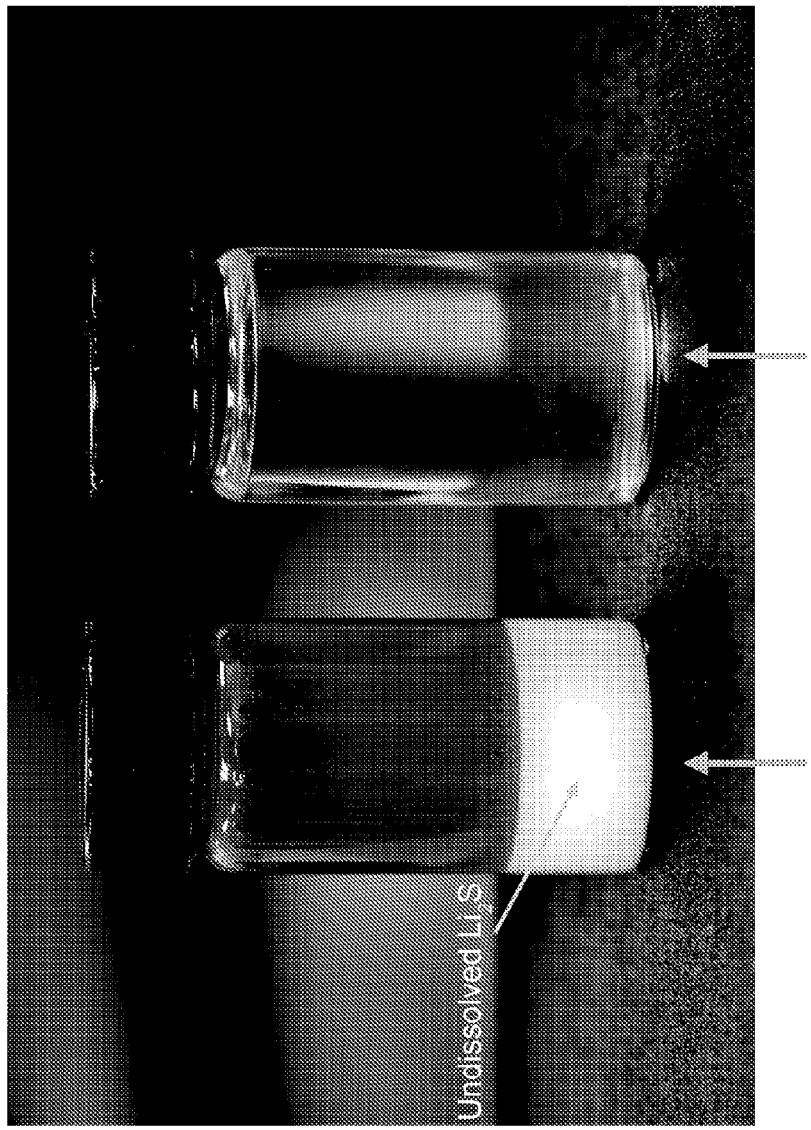
FIG. 4 is a photograph comparing the solubility of $Li_2S$ in water with that in a non-aqueous solvent.

Of particular note is the high solubility and facile dissolution of $Li_2S$ (lithium sulfide) in water. In non-aqueous aprotic solvents lithium sulfide solubility is severely limited, and $Li_2S$ is generally considered to be insoluble. Water is shown herein to provide an excellent solvent for lithium sulfide ($Li_2S$), and this feature is used for advantage in various embodiments of the instant disclosure in order to achieve high ampere-hour (Ah) capacity per unit volume of catholyte, and ultimately high cell energy density as well as improved reversibility on deep discharge. A visual comparison is provided in FIG. 4, illustrating that water has at least a 1000 fold greater solubility for $Li_2S$ than that of tetraglyne (a common non-aqueous solvent employed in conventional non-aqueous Li/S cells).

Accordingly, in various embodiments the aqueous catholyte serves as a medium into which high concentrations of $Li_2S$ dissolve. Thus, by this expedient, aqueous lithium sulfur cells yielding a high ampere-hour capacity per unit volume of catholyte can be realized, and these high capacity cells may be deeply discharged repeatedly since the reaction product (e.g., $Li_2S$) is readily dissolved and therefore more readily oxidized on charge. Thus, in various embodiments, at the end of discharge a significant portion of the sulfur ampere-hour capacity is present in the cell in the form of solid phase discharge product (e.g., $Li_2S$). For instance, in embodiments, the end of discharge ratio comparing the number of moles of sulfur as solid phase sulfur (e.g., $Li_2S$) to the number of moles of sulfur dissolved in the catholyte (e.g., as $Li_2S$) is greater than 2; greater than 3; greater than 5, or greater than 10.

Furthermore, the combination of high solubility and fast dissolution kinetics of $Li_2S$ in water also enables a practical method of making an aqueous lithium sulfur cell that is assembled in the fully discharged state, and which makes use of alternative lithium electroactive materials that are different than that of lithium metal, such as carbon intercalation materials, alloys (e.g., of silicon) and combinations thereof such as carbon silicon composites. For example, one method in accordance with the present disclosure involves: i) providing a carbon anode in the fully discharged state (i.e., entirely un-intercalated); ii) providing an aqueous polysulfide catholyte comprising water and dissolved lithium sulfide; iii) providing a cathode comprising an electron transfer medium for electrochemical oxidation of dissolved lithium sulfide; iv) configuring the anode, catholyte and cathode into a battery cell; and iv) charging the battery cell.

Whereas the fast dissolution kinetics of $Li_2S$ enables repeated deep discharge, additional benefit may be gained by taking advantage of the facile electro-kinetics of solution phase redox in combination with the high solubility of polysulfide species in water. Thus, in various embodiments, the cell is formulated such that at full state of charge the catholyte contains a high concentration of dissolved active sulfur species, and in certain embodiments the cell is formulated and operated such that the ampere-hour capacity of sulfur in the cell at full state of charge is solely present as dissolved species in the catholyte.

Without intending to be limited by theory, lithium sulfide dissolution in water involves hydrolysis that is believed to take place in accordance with the following equilibrium:

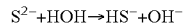

Thus the pH of highly concentrated aqueous catholyte solutions of $Li_2S$ dissolved in water is generally quite high and typically greater than pH 10, and more typically greater than pH 11 or even higher, e.g., about pH 12, about pH 13, or about pH 14. However, the disclosure is not exclusively limited to cells having an aqueous sulfur catholyte of such high pH, as the pH may be tailored using pH adjusting additives, including base, basic salts (e.g., LiOH), acidic salts (e.g., HCl) and buffering agents as are known to those of skill in the art. Thus, in various embodiments the catholyte may be formulated having a pH that renders it acidic (i.e., pH<7), basic (i.e., pH >7), or neutral (pH about 7).

The aqueous catholyte may further comprise a supporting lithium salt to maintain a consistent and high conductivity over the entire discharge and/or improve stability. Typically the supporting salt concentration is in the range of 0.05 to 1.5 moles/liter (e.g., about 0.25 moles/liter). Examples of suitable supporting salts include a variety of lithium cation salts. For instance, lithium halides (e.g., LiCl, LiBr), $LiSO_3CF_3$, $LiN(CF_3SO_2)_2$ and $LiN(SO_2C_2F_5)_2$. Typically present in the catholyte to a concentration of about 0.05 to 1.5 molar lithium, e.g., 0.1, 0.2, 0.3, 0.4, 0.5, 0.6, 0.7, 0.8, 0.9, or 1.0 molar lithium.

Electroactive aqueous catholytes in accordance with the instant disclosure comprise water and an active sulfur species dissolved therein. In various embodiments the active sulfur species are formed in the catholyte by reacting one or more precursor materials with each other and/or with water. In one embodiment a first precursor of lithium sulfide and a second precursor of elemental sulfur are reacted in stoichiometric amounts in the presence of water to yield active sulfur species in solution. Preferably, to mitigate the undesirable formation of insoluble products of oxidation, the water should be deoxygenated (i.e., the water should be substantially devoid of molecular oxygen), which may be carried out by any suitable method known in the art, including boiling of the water and/or purging the water with an oxygen free gas, such as nitrogen. The purging step continued until the desired level of oxygen has been reached. For instance, the concentration of molecular oxygen in the catholyte is preferably less than 1000 ppm, and more preferably less than 500 ppm and even more preferably less than 100 ppm, or less than 50 ppm or even 10 ppm.

In various embodiments the aqueous catholyte further comprises one or more non-aqueous solvents. In various embodiments the volume percent of non-aqueous solvents in the catholyte ranges from about 1% to as much as 90% by volume; for example, between 1% and 10%, between 10% and 20%, between 20% and 30%, between 30% and 40%, between 40% and 50%, between 50% and 60%, between 60% and 70%, between 70% and 80%, between 80% and 90%.

Non-aqueous solvents suitable for use herein to improve performance include aprotic and protic organic solvents (solids and liquids, typically liquids or solid polyethylene oxide) and ionic liquids. In particular, in some embodiments protic organic solvents may be used.

Examples of suitable non-aqueous aprotic and protic solvents include ethers (e.g., 2-methyltetrahydrofuran (2-MeTHF), Tetrahydrofuran (THF), 4-Methyldioxolane (4-MeDIOX), Tetrahydropyran (THP) and 1,3-Dioxolane (DIOX)) glymes (e.g., 1,2-dimethoxyethane (DME/monoglyme), di-glyme, tri-glyme, tetra-glyme and higher glymes), carbonates (e.g., cyclic carbonates such as propylene carbonate (PC), ethylene carbonate (EC), acyclic carbonates such as dimethyl carbonate (DMC), ethylmethyl carbonate (EMC) and diethyl carbonate (DEC), formates (e.g., Methyl Formate) and butyrolactone (GBL). Other suitable aprotic solvents include those having a high donor number (i.e., donor solvents) such as hexamethylphosphoramide, pyridine, N,N-diethylacetamide (DMAC), N,N-diethylformamide, dimethylsulfoxide (DMSO), tetramethylurea (TMU), N,N-dimethylacetamide, N,N-dimethylformamide (DMF), tributylphosphate, trimethylphosphate, N,N,N',N'-tetraethylsulfamide, tetraethylenediamine, tetramethylpropylenediamine, and pentamethyldiethylenetriamine. Preferred donor solvents have a donor number of at least 15, more preferably between about 15 and 40 and most preferably between about 18-40. Particularly preferred donor solvents include N,N-diethylformamide, N,N-dimethylformamide (DMF), dimethylsulfoxide (DMSO), N,N-dimethylacetamide (DMAC); for example, DMF. Suitable acceptor solvents which can be characterized as Lewis acids (they may be protic or aprotic solvents) and promote solvation of anions. Examples include alcohols such as methanol, glycols such as ethylene glycol and polyglycols such as polyethylene glycol as well as nitromethane, triflouroacetic acide, trifluoromethanesulfonic acid, sulfur dioxide and boron triflouride, and ethylene glycol (EG). Others include nitriles (e.g., acetonitrile (AN), higher nitriles, propionitrile, succinonitrile, butyronitrile, benzonitrile), amides (e.g., formamide, N-methylformamide, N,N-dimethylformamide, N,N-diethylformamide, (DMF), acetamide, N-methylacetamide, N,N-dimethylacetamide (DMAC), N,N-diethylacetamide, N,N,N'N'tetraethylsulfamide, tetramethylurea (TMU), 2-pyrrolidone, N-methylpyrrolidone, N-methylpyrrolidinone), amines (e.g., butylamine, ehtylenediamine, triethylamine, pyridine, 1,1,3,3-tetramethylguanidine (TMG), tetraethylenediamine, tetramethylpropylenediamine, pentamethyldiethylenetriamine, organosulfur solvents (e.g., dimethylsulfoxide (DMSO), sulfolane, other sulfones, dimethylsulfite, ethylene sulfite, and organophosphorous solvents (e.g., tributylphosphate, trimethylphosphate, hexamethylphosphoramide (HMPA)).

In the same or separate embodiments a non-aqueous solvent may be added to the aqueous catholyte to effect dissolution of elemental sulfur. The addition of such a solvent (e.g., toluene or carbon disulfide, preferably toluene) can enable charging to elemental sulfur (dissolved or precipitated).

While the use of non-aqueous solvents such as aprotic organic solvents, typically liquids, but not limited as such, may be useful for facilitating the dissolution of high order polysulfide species, protic solvents and ionic liquids may also be incorporated in the aqueous catholyte to further enhance dissolution of lithium sulfide or more generally improve cell performance.

For instance, in particular embodiments the aqueous catholyte comprises water and a protic solvent that is non-aqueous, especially protic organic solvents that are capable of dissolving a significant amount of $Li_2S$. Particularly suitable non-aqueous protic solvents are organic solvents such as alcohols, diols, triols and polyols, especially alcohols (e.g., methanol and ethanol) and diols (e.g., ethylene glycol). Addition of the non-aqueous protic solvent is particularly useful in cells that may be operated at temperatures below the freezing temperature of water and yet still require high solubility for lithium sulfide. Accordingly, in various embodiments the catholyte is formulated with an amount of a non-aqueous protic solvent to achieve a desired freezing point temperature (i.e., melt temperature), including formulations wherein the melt temperature is less than 0° C., less than –5° C., less than –10° C., less than –15° C., less than –20° C., less than –30° C., and less than –40° C. Moreover, it is contemplated herein that the non-aqueous protic solvent may be present in high concentration in the catholyte, including 10%-20%, 20%-30%, 30%-40%, 40%-50%, 50%-60%, 60%-70%, 70%-80%, 80%-90% (e.g., any such volume percentages of methanol, ethanol or ethylene glycol or combinations thereof).

Contact between the aqueous electrolyte and the cathode electron transfer medium, for example an electronically conductive matrix such as a carbon or metal mesh, foam or other high surface area, typically porous, structure, may be enhanced by electrolyte additives and/or co-solvents. Such improved contact enhances utlilization and rate performance of the cell. Electrolyte/catholyte compositions in this regard can include a surfactant, such as a polyol or polyglycol, for example PEG, to wet the catholyte to the conductive matrix. Also or alternatively, the matrix can be surface treated prior to contact with the electrolyte to enhance wetting, for example being soaked in a wetting agent, such as methanol or ethylene glycol, followed by displacement of the wetting agent with the aqueous catholyte solution of polysulfides. Still further in this regard, the catholyte may include dissolved organosulfur as a cathode active material. The organosulfur compound or compounds can self-wet to the cathode electron transfer matrix.

In accordance with various embodiments, the aqueous electrolyte includes a combination of solvents and lithium sulfur electro-active species typically dissolved therein. The solvent combination includes at least water and a second solvent that contains nitrogen (i.e., the second solvent is a nitrogen containing compound, sometimes referred to herein as an N-solvent or N-compound). Typically the N-solvent is protic and has a high Gutmann donor number.

The aqueous electrolye may further include a lithium salt or other salt dissolved therein for the purpose of enhancing conductivity or lithium ion transference. However, in various embodiments it is contemplated that the only dissolved lithium species in the electrolyte are those which are associated with the electro-active lithium sulfur species (e.g., lihtium polysuflides).

In various embodiments the catholyte solvent system is based on a solvent combination of water with protic and aprotic solvents and other compounds. These solvent systems may include those containing water and other protic solvents, dissolved solids, or gases. In various embodiments the solvent system contains water and polar protic solvents. Such solvent systems allow for preparation of catholytes that are superior to the catholytes based on any type of individual solvent, including water or an organic solvent. Such catholytes combine very high solubility of long chain polysulfides, high solubility of cell discharge products ($Li_2S$ or short chain polysulfides), appreciable solubility of elemental sulfur, which is the final charge product, high ionic conductivity, and improved wetting of carbon materials used as cathodes of Li—S batteries.

The protic solvents may be various N-containing compounds having high Gutmann donor number. The preferred catholyte compositions include aqueous ammonia, water-amine solvent combinations, and solvent systems of water-N-heterocyclic compound.

In various embodiments the catholyte composition comprises primary, secondary, or tertiary amines or ammonia and are represented by a general formula:

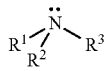

wherein $R^1$ is H or an organic radical, $R^2$ is H or an organic radical, and $R^3$ is H, or an organic radical.

In various embodiments at least one of $R^1$, $R^2$, and $R^3$ is an organic radical. In some preferred embodiments at least one of $R^1$, $R^2$ or $R^3$ contains one or more amine groups. In other preferred embodiments at least one of $R^1$, $R^2$ or $R^3$ contains one or more hydroxyl groups. In other preferred embodiments at least one of $R^1$, $R^2$ or $R^3$ contains one or more ether groups.

For instance, in some embodiments, at least one of $R^1$, $R^2$ and $R^3$ is an organic radical selected from the group consisting of an optionally substituted $C_1$-$C_{10}$ alkyl group, optionally substituted $C_2$-$C_{10}$ alkenyl group, and optionally substituted $C_2$-$C_{10}$ alkynyl group. A "substituted group" is derived from the unsubstituted parent structure in which one or more hydrogen atoms are exchanged for another atom or a group of atoms. In other embodiments, at least one of $R^1$, $R^2$ and $R^3$ represents an organic radical selected from the group consisting of an optionally substituted $C_4$-$C_{10}$ cycloalkyl, optionally substituted $C_4$-$C_{10}$ cycloalkenyl, and optionally substituted 3-10 membered heterocyclyl. In yet other embodiments at least one of $R^1$, $R^2$ and $R^3$ represents an organic radical selected from the group consisting either of an optionally substituted carbo- and heterocyclic 5-10 membered aryl, or a benzylic group.

In various embodiments $R^1$, $R^2$, and $R^3$ are organic radicals, which do not contain ether groups or hydroxyl groups. In the most preferred embodiments, at least one of $R^1$, $R^2$ or $R^3$ contains one or more amine groups. The particular examples include: ethylenediamine, diethylenetriamine, trimethylamine, n-propylamine, methylamine, dimethylamine, ethylamine, diethylamine, isopropylamine, diisopropylamine, dimethylaminopropylamine, diethylenetriamine, allylamine, tetraethylenediamine, tetramethylpropylenediamine, pentamethyldiethylenetriamine, cyclopropylamine, or their combinations.

In some embodiments at least one of $R^1$, $R^2$ or $R^3$ contains one or more hydroxyl groups. For example, 2-(ethylamino)ethanol, ethanolamine, diethanolamine, N-methylethanolamine, N-methyldiethanolamine, 2-amino-2-methyl-1-propanol, N,N-dimethylethanolamine, 2-(2-aminoethoxy)ethanol, or their combinations.

In some embodiments at least one of $R^1$, $R^2$ or $R^3$ contains one or more ether groups. The particular examples include: 2-methoxyethylamine, (2-methoxyethyl)methylamine, 3-methoxypropylamine, bis(2-methoxyethyl)amine, 2-methoxyisopropylamine, 2,2-dimethoxyethylamine, 3-ethoxy-1-propanamine, 2-(2-aminoethoxy)ethylamine, 2,2'-(Ethylenedioxy)bis(ethylamine), or some combination thereof.

Particular instant catholytes include: i) 12M sulfur as $Li_2S_5$ in 20% (v/v) 2-methoxyethylamine; ii) 14.6M sulfur as $Li_2S_5$ in 40% 2-methoxyethylamine; and 12M sulfur as $Li_2S_6$ in 60% 2-methoxyethylamine; 12M sulfur as $Li_2S_6$ in 20% (v/v) ethylenediamine; and 12M sulfur as $Li_2S_7$ in 40% (v/v) ethylenediamine.

Preferable volume fraction of amine in the solvent system is from 1% to 60%. The most preferable volume fraction is in the range 5-50%.

Preferable amines have pKa values of the corresponding conjugate acids greater or equal to 5. Even more preferable amines have pKa values of the corresponding conjugate acids greater or equal to 7. The most preferable amines have pKa values of the corresponding conjugate acids greater or equal to 9.

In various embodiments the isntant catholytes has water and an N-compound as the solvent system and the catholyte is in equilibrium with an excess of elemental sulfur. In various embodiments the instant catholyte has 60%, 40%, and 20% (v/v) of 2-methoxyethylamine, or 20% ethylenediamine (v/v) of 2-methoxyethylammonium polysulfide in water with 20%, 40%, and 60% (v/v) of 2-methoxyethylamine, accordingly.

In various embodiments the aqueous catholyte solution (i.e., catholyte) has a solvent system that is water and 2-methoxyethylamine as the cycle-life enhancing compound. In embodiments thereof the volume ratio of 2-methoxyethylamine in the solvent system is between >10 to 20%, between >20% to 30%, between >30 to 40%, between >40 to 50%, and between >50-60%.

In various embodiments all $R^1$, $R^2$, and $R^3$ represent H (ammonia). In other words the nitrogen containing solvent is ammonia. These include catholytes comprising 12M S as $Li_2S_5$ in 14% (m/m) $NH_3$, And 16.0M S as $Li_2S_5$ in 28% (m/m) $NH_3$, and 16.5M S as $Li_2S_5$ in 14% (m/m) $NH_3$. Preferable mass fractions of ammonia in water are in the range from 5 to 35% (m/m). The most preferable mass fraction of ammonia in water is in the range from 14 to 33%. In various embodiments the N-solvents are ammonia, ethylenediamine, 2-methoxyethylamine, bis(2-methoxyethyl)amine, 2-(methylamino)ethanol, n-propylamine, methylamine, dimethylamine, ethylamine, diethylenetriamine.

In various embodiments the N-solvents are N-heterocyclic compounds represented by general formula

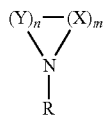

where m, n=1, 2, 3, 4, 5, and (m+n) is less than 6;
X is $CR^1R^2$ (optionally substituted methylene group), where $R^1$ and $R^2$ represent H or an organic radical, or
X is $CR^1$ (when N-heterocycle is unsaturated or aromatic) where $R^1$ represents H or an organic radical, or
X is N (X is nitrogen atom when N-heterocycle is unsaturated or aromatic), or
X is $NR^3$ (X is $NR^3$ group), where $R^3$ represents H or an organic radical, or
X is O (X is oxygen atom), or
X is S (X is sulfur atom).

In various embodiments N-heterocycle is saturated N-heterocycle, or aromatic N-heterocycle, or unsaturated N-heterocycle that may contain X=X, X=Y, X=N, Y=N double bonds where X is not oxygen atom and is not sulfur atom.

In other embodiments the N-heterocyclic compound is a solvent that is miscible with water. The most preferable N-heterocyclic solvents are: morpholine, pyrrolidine, piperidine, pyridine, aziridine, 1,4-thiazine.

In some embodiments N-heterocyclic compounds are in the form of solids dissolved in water. The preferable solid N-heterocyclic compounds are: imidazole, thiomorpholine, piperazine.

Preferably the N-heterocyclic compounds are the compounds with pKa values of the conjugate N—H acids greater than 5.

In various embodiments the catholyte further includes alcohols and glycol ethers. Examples include alcohols such as methanol, ethanol, n-propanol, i-propanol. Glycols such as ethylene glycol, glycerol, and polyglycols such as polyethylene glycol. Glycol ethers such as ethylene glycol monomethyl ether (2-methoxyethanol), diethylene glycol monoethyl ether (carbitol), diethylene glycol monomethyl ether (methyl carbitol), ethylene glycol monoethyl ether (2-ethoxyethanol), ehylene glycol monopropyl ether (2-propoxyethanol, ethylene glycol monoisopropyl ether, ethylene glycol monobutyl ether, diethylene glycol mono-n-butyl ether.

In various embodiments the catholyte further includes mixtures containing water and polar or non-polar aprotic solvents. Mixtures of water with polar aprotic solvents can be used to increase the mean chain length of polysulfides. The preferable solvents are the solvents that have high Gutmann donor numbers. Examples of suitable non-aqueous aprotic solvents that can be used in combination with water include linear and cyclic ethers (e.g. tetrahydrofuran (THF), 4-methyl-1,3-dioxolane (4-MeDIOX), tetrahydropyran (THP)), glymes (e.g., 1,2-dimethoxyethane (DME/monoglyme), diglyme, triglyme, tetraglyme and higher glymes). Other suitable aprotic solvents include amides such as formamide, N,N-dimethylacetamide (DMA), N,N-dimethylformamide (DMF), N-methylformamide, N-ethylformamide, N,N-diethylacetamide, N,N-diethylformamide.

In various embodiments methods may be used to increase chain length of polysulfides. The chain length can be increased using various methods. For instance, increasing the temperature can be used to increase polysulfide chain length in the catholyte. For example, the mean chain length in 10M S lithium polysulfide, water solution in equilibrium with elemental sulfur is determined to be 5.0 at 70° C. Alternatively, decreasing the pH of the electrolyte may be used to increase polysulfide chain length. In particular embodiments, various acids are added to partially neutralize hydroxide ions in the aqueous catholyte and by this expedient shifts the equilibrium towards polysulfide anions with higher chain length.

Lithium Anode

Typically, when using a protected lithium electrode as described below in which a solid electrolyte membrane provides isolation of the electroactive material against contact with the aqueous catholyte, the catholyte is devoid of certain extraneous ions which would otherwise interfere with the cell functionality, including contaminating the membrane via diffusion into the conductive atomically formed channels. Accordingly, in various embodiments of the instant disclosure the aqueous catholyte is substantially devoid of alkali metal cations other than lithium, and more preferably substantially devoid of all metal cations other than lithium. For example the catholyte is devoid of sodium and potassium ions, which is to mean that there is substantially no sodium or potassium ions in the electrolyte.

The cell comprises a Li anode. The lithium electroactive material of the anode is typically in layered form and may be Li metal or a Li metal alloy (e.g., silicon) or Li intercalation material (e.g., lithiated carbon) or in a particular embodiment a silicon carbon composite. In one example, a Li metal foil may be used. In another example lithium ion anodes, which are well known in the battery art, are used as the electroactive lithium material layer (e.g., a carbon intercalation material coated on a copper current collector). Electroactive lithium materials, including intercalation host compounds and lithium alloys and lithium metal are well known in the lithium battery art. In certain embodiments the anode is lithium metal (e.g., in foil or sintered form) and of sufficient thickness (i.e., capacity) to enable the cell to achieve the rated discharge capacity of the cell. The anode may take on any suitable form or construct including a green or sintered compact (such as a wafer or pellet), a sheet, film, or foil, and the anode may be porous or dense. Without limitation, the lithium anode may have a current collector (e.g., copper foil, or suitable expandable metal) pressed or otherwise attached to it in order to enhance the passage of electrons between it and the leads of the cell. Without limitation the cell may be anode or cathode limited. When anode limited, the complete discharge (corresponding to rated capacity) will substantially exhaust all the lithium in the anode. When cathode limited, some active lithium will remain subsequent to the cell delivering its rated capacity.

The anode is protected with a protective membrane architecture chemically stable to both the anode and the environment of the adjacent sulfur cathode. The protective membrane architecture typically comprises a solid electrolyte protective membrane and an interlayer. The solid electrolyte protective membrane is sometimes referred to herein as ion membrane. The protective membrane architecture is in ionic continuity with the Li anode and is configured to selectively transport Li ions while providing an impervious barrier to the environment external to the anode. Protective membrane architectures suitable for use with embodiments described in this disclosure are described in applicants' U.S. Pat. Nos. 7,645,543; 7,666,233; 8,048,571; and 7,282,295, incorporated by reference herein in their entirely, and in particular for their description of protective membrane structures and architectures.

FIGS. 5A-D illustrate representative protective membrane architectures from these disclosures suitable for use with embodiments described in this disclosure. The protective membrane architectures provide a barrier to isolate a Li anode from ambient and/or the cathode side of the cell while allowing for efficient ion Li metal ion transport into and out of the anode. The architecture may take on several forms. Generally it comprises a solid electrolyte layer that is substantially impervious, ionically conductive and chemically compatible with the external ambient (e.g., air or water) or the cathode environment.

Figure 5A:
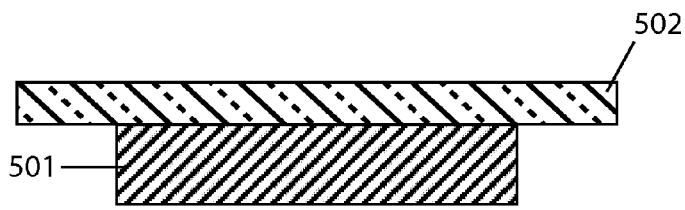
FIGS. 5A-D illustrate various alternative configurations of a protective membrane architecture in accordance with the present disclosure.

Referring to FIG. 5A, the protective membrane architecture can be a monolithic solid electrolyte 502 that provides ionic transport and is chemically stable to both the active metal anode 501 and the external environment. Examples of such materials are lithium hafnium phosphates (e.g., having a NASICON like structure) such as $Li_{1+x}M_xHf_{2-x}(PO_4)_3$ where M is Cr, In, Fe, Ta, Sc, Lu, Al, or Y (e.g., wherein $0 \leq x \leq 0.5$, and $LiHfPO_4$, LISICON (the lithium-stable analog to NASICON), $Li_5La_3Ta_2O_{12}$, and $Li_5La_3Nb_2O_{12}$, $Na_5MSi_4O_{12}$ (M: rare earth such as Nd, Dy, Gd) and the garnet-like structures described below. These include $Li_{5+x}A_yG_zM_2O_{12}$ (where A is a monovalent, divalent, trivalent, or tetravalent cation; G is a monovalent, divalent, trivalent, or tetravalent cation; where M is a trivalent, tetravalent or pentavalent cation, and $0 \leq x \leq 3$, $0 \leq y \leq 3$, $0 \leq z \leq 3$ and O can be partly or completely replaced by divalent and/or trivalent anions such as $N^{3-}$. Particular examples include $Li_6ALa_2B_2O_{12}$ where B is Nb or Ta or some combination thereof and A may be Ca, Sr, Ba or a combination thereof, especially $Li_6BaLa_2Ta_2O_{12}$; $Li_5La_3M_2O_{12}$ (where M=Nb, Ta or some combination thereof) e.g., $Li_5La_3Ta_2O_{12}$ or $Li_5La_3Nb_2O_{12}$ or $Li_{7+x}A_xG_{3-x}Zr_2O_{12}$ where A is a divalent cation, G is a trivalent cation, $0 \leq x \leq 3$ and O can be partly or completely replaced by divalent and/or trivalent anions such as $N^{3-}$ (e.g., $Li_{7+x}A_xLa_{3-x}Zr_2O_{12}$ such as $Li_7La_3Zr_2O_{12}$ or e.g., wherein A is Zn such as $Li_{7-x}Zn_xLa_{3-x}Zr_2O_{12}$ and the like such as and $Li_{7+x}A_xLa_{3-x}Hf_2O_{12}$ (e.g., where A is Zn or $Li_7La_3Zr_2O_{12}$). These materials and methods for making them are described in U.S. Pat. No. 7,901,658 to Weppner and Thangadurai and US Patent Publication No.: 2010/0203383 to Weppner, and are hereby incorporated by reference, in particular for their disclosure relating to the composition and making of these materials. As well as $Li_{5+x}La_3(Zr_x, A_{2-x})O_{12}$ wherein A is at least one selected from the group consisting of Sc, Ti, V, Nb, Hf, Ta, Al, Si, Ga, Ge, and Sn, such as $Li_{5+x}La_3(Zr_x, Nb_{2-x})O_{12}$ where x=0-2, and including elements substituted for Zr such as Sc, Ti, V, Y, Hf, Ta and Nb or the like (e.g., $Li_{6.75}La_3Zr_{1.75}Nb_{0.25}O_{12}$, such garnet-like lithium ion conductors are described in US Patent Pub. No.: 2011/0244337 to Ohta et al which is hereby incorporated by reference.

More commonly, the ion membrane architecture is a composite composed of at least two components of different materials having different chemical compatibility requirements, one chemically compatible with the anode, the other chemically compatible with the exterior; generally ambient air or water, and/or battery electrolytes/catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

Figure 5B:
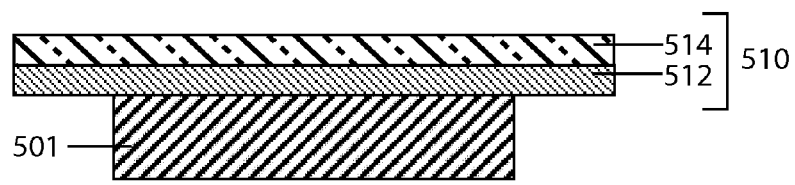
Figure 5C:
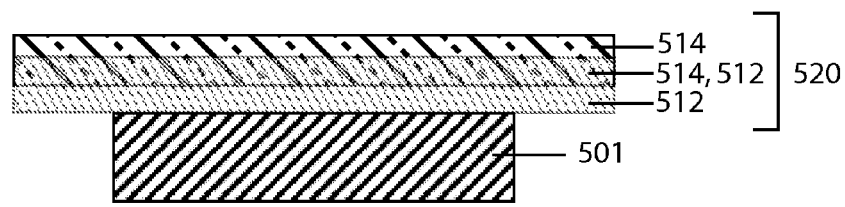

Referring to FIG. 5B, the protective membrane architecture can be a composite solid electrolyte 510 composed of discrete layers, whereby the first material layer 512 (also sometimes referred to herein as "interlayer") is stable to the active metal anode 501 and the second material layer 514 is stable to the external environment. Alternatively, referring to FIG. 5C, the protective membrane architecture can be a composite solid electrolyte 520 composed of the same materials, but with a graded transition between the materials rather than discrete layers.

Generally, the solid state composite protective membrane architectures (described with reference to FIGS. 5B and C have a first and second material layer. The first material layer (or first layer material) of the composite is ionically conductive, and chemically compatible with an active metal electrode material. Chemical compatibility in this aspect of the disclosure refers both to a material that is chemically stable and therefore substantially unreactive when contacted with an active metal electrode material. It may also refer to a material that is chemically stable with air, to facilitate storage and handling, and reactive when contacted with an active metal electrode material to produce a product in-situ that is chemically stable against the active metal electrode material and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figure 5D:
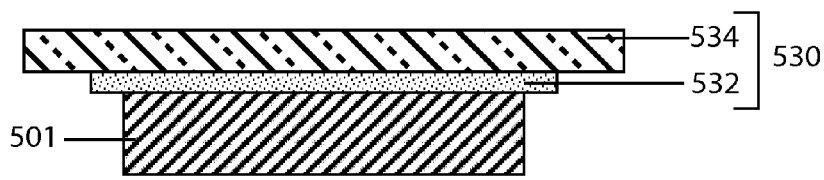

A fourth suitable protective membrane architecture is illustrated in FIG. 5D. This architecture is a composite 530 composed of an interlayer 532 between the solid electrolyte 534 and the active metal anode 501 whereby the interlayer is includes a non-aqueous liquid, gel or solid polymer electrolyte polymer phase anolyte. Thus, the architecture includes an active metal ion conducting separator layer with a non-aqueous anolyte (i.e., electrolyte in contact with the anode electroactive material), the separator layer being chemically compatible with the active metal and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 5D) generally shares the properties of the second material layer for the composite solid state architectures (FIGS. 5B and C). Accordingly, the solid electrolyte layer of all three of these architectures will be referred to below as a second material layer or second layer.

A wide variety of materials may be used in fabricating protective composites in accordance with the present disclosure, consistent with the principles described above. For example, in the solid state embodiments of FIGS. 5B and 5C, the first layer (material component), in contact with the active metal, may be composed, in whole or in part, of active metal nitrides, active metal phosphides, active metal halides active metal sulfides, active metal phosphorous sulfides, or active metal phosphorus oxynitride-based glass, as well as lithium hafnium phosphates and the garnet like structures described above in reference to the monolithic membrane architecture (e.g., $Li_{7+x}A_xLa_{3-x}Zr_2O_{12}$ and $Li_{5+x}A_yG_zM_2O_{12}$ such as $Li_6BaLa_2Ta_2O_{12}$ and the others as described herein above. Specific examples include $Li_3N$, $Li_3P$, LiI, LiBr, LiCl, LiF, $Li_2S$—$P_2S_5$, $LiI_2S$—$P_2S_5$—LiI and LiPON. Active metal electrode materials (e.g., lithium) may be applied to these materials, or they may be formed as reaction products in situ by contacting precursors such as metal nitrides, metal phosphides, metal halides, red phosphorus, iodine, nitrogen or phosphorus containing organics and polymers, and the like with lithium. A particularly suitable precursor material is copper nitride (e.g., $Cu_3N$). The in situ formation of the first layer may result from an incomplete conversion of the precursors to their lithiated analog. Nevertheless, such composite reaction products formed by incomplete conversions meet the requirements of a first layer material for a protective composite in accordance with the present disclosure and are therefore within the scope of the disclosure.

For the anolyte interlayer composite protective architecture embodiment (FIG. 5D), the protective membrane architecture has an active metal ion conducting separator layer chemically compatible with the active metal of the anode and in contact with the anode, the separator layer comprising a non-aqueous anolyte, and a substantially impervious, ionically conductive layer ("second" layer) in contact with the separator layer, and chemically compatible with the separator layer and with the exterior of the anode. The separator layer can be composed of a semi-permeable membrane impregnated with an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will, of course, also include active metal salts, such as, in the case of lithium, for example, $LiPF_6$, $LiBF_4$, $LiAsF_6$, $LiSO_3CF_3$ or $LiN(SO_2C_2F_5)_2$. One example of a suitable separator layer is 1 M $LiPF_6$ dissolved in propylene carbonate and impregnated in a Celgard microporous polymer membrane.

The second layer (material component) of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulfur-based glass, oxide/sulfide based glass, selenide based glass, gallium based glass, germanium-based glass, Nasiglass; ceramic active metal ion conductors, such as lithium beta-alumina, sodium beta-alumina, Li superionic conductor (LISICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $Li_{1-x}Ti_{2-x}Al_x(PO_4)_3$ ($0.1 \leq x \leq 0.9$) and crystallographically related structures, $Li_{1+x}Hf_{2-x}Al_x(PO_4)_3$ ($0.1 \leq x \leq 0.9$), $Li_3Zr_2Si_2PO_{12}$, $Na_5ZrP_3O_{12}$, Li-Silicates, $Li_{0.3}La_{0.5}TiO_3$, $Li_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0<X \leq 0.4$ and $0<Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Another particularly suitable material for the second layer of the protective composite is a lithium ion conducting oxide having a garnet like structure. These include those described above with reference to the monolithic membrane architecture, and include $Li_6BaLa_2Ta_2O_{12}$; $Li_7La_3Zr_2O_{12}$, $Li_5La_3Nb_2O_{12}$, $Li_5La_3M_2O_{12}$ (M=Nb, Ta) $Li_{7+x}A_xLa_{3-x}Zr_2O_{12}$ where A may be Zn. These materials and methods for making them are described in U.S. Patent Application Pub. No.: 2007/0148533 (application Ser. No. 10/591,714), hereby incorporated by reference in its entirety, and suitable garnet like structures are also described in International Patent Application Pub. No.: WO/2009/003695 which is hereby incorporated by reference for all that it contains, and in particular for its description of garnet-like structures.

Another particularly suitable material for the second layer of the protective composite is a lithium ion conducting oxide having a garnet like structure. These include those described above with reference to the monolithic membrane architecture, and include $Li_6BaLa_2Ta_2O_{12}$; $Li_7La_3Zr_2O_{12}$, $Li_5La_3Nb_2O_{12}$, $Li_5La_3M_2O_{12}$ (M=Nb, Ta) $Li_{7+x}A_xLa_{3-x}Zr_2O_{12}$ where A may be Zn. These materials and methods for making them are described in U.S. Patent Application Pub. No.: 2007/0148533 (application Ser. No. 10/591,714), hereby incorporated by reference in its entirety, and suitable garnet like structures are also described in International Patent Application Pub. No.: WO/2009/003695 which is hereby incorporated by reference for all that it contains, and in particular for its description of garnet-like structures.

The composite should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode. For example, the first material layer for the solid state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example about 20 microns.

Seals and methods of making seals which are particularly suitable for sealing protected anodes described hereinabove and elsewhere, including compliant and rigid seals, are fully described in US Patent Publication No.: 2007/0037058 and US Patent Publication No.: US 2007/0051620 to Visco et al., and are hereby incorporated by reference in their entirety, and in particular for their descriptions of cell seals and sealing techniques.

Optional Separator

With reference to FIG. 1 an optional separator component 130 may be interposed between the membrane architecture and the sulfur cathode. Various separator materials suitable for use herein are known in the battery arts. These separators include porous inorganic mats, microporous polymer sheets, and gels. In a particular embodiment the separator is a hydrogel comprising water impregnated a polymer. In some embodiments the polymer itself may also serve as a solid solvent for the dissolution of active sulfur species, such as PEO and polyalcohols (e.g., polyvinyl alcohol).

In various embodiments the instant battery cell is fabricated such that the entirety of the cathode capacity is loaded into the cell upon fabrication as dissolved polysulfide species (e.g., the active stoichiometric ratio of $Li_2Sx$ with x is >1 e.g., about $Li_2S_2$, about $Li_2S_3$, about $Li_2S_4$, and about $Li_2S_5$). In certain embodiments solid phase sulfur is added to further enhance cell capacity (i.e., the cathode active species derived from a combination of dissolved polysulfide species and solid elemental sulfur. In some embodiments the entirety of the cathode active sulfur is loaded into the cathode as solid elemental sulfur. While in other embodiments, as described herein, the catholyte is in a fully reduced state composed of $Li_2S$ dissolved in water, and in some embodiments thereof solid phase $Li_2S$ may be dispersed in the catholyte or present as a solid particle in the pores of the cathode or separator.

In accordance with various embodiments of the instant disclosure a significant amount of the cathode ampere-hour capacity is derived from the active aqueous sulfur catholyte, and that amount is typically greater than 10%; for instance, greater than 20%, greater than 30%, greater than 40%, greater than 50%, greater than 60%, greater than 70%, greater than 80%, greater than 90%, and in certain embodiments 100%.

Aqueous Lithium Sulfur Cells Assembled in the Discharged State

The fast kinetics of dissolution and high solubility of lithium sulfide in water allows for a practical lithium sulfur cell that makes use of alternative anodes (e.g., anodes other than lithium metal) which are entirely devoid or mostly devoid of active lithium when incorporated in the cell during assembly, and remain in that state until the cell is initially operated via an electrochemical charge. By this expedient, aqueous lithium sulfur cells assembled in the discharged state and having anodes of exceptional reversibility are enabled herein for providing battery cells of long cycle life, low cost, and/or improved air stability for manufacturing. In accordance with such embodiments and continuing with reference to FIG. 1, in various embodiments thereof the instant cell includes a protected lithium anode, similar in structure to that described above, having a lithium electroactive layer devoid of active lithium prior to initial cell operation (i.e., the cell assembled having an anode with an electroactive layer devoid of active lithium). Suitable such electroactive layers include those coated on a current collector as are known in the lithium ion battery field. The anode layers composed of anode electroactive materials including those commonly referred to as intercalation materials, insertion materials, alloying materials, intermetallic materials and the like, which in the fully discharged state (i.e., fully or mostly in a reduced oxidation state), and when incorporated into the cell during manufacture are entirely devoid, or mostly devoid, of active lithium. Particularly suitable such materials include carbons capable of electrochemically intercalating lithium, metal compound intercalation materials, such as metal oxide compounds including transition metal oxides such as molybdenum oxide, tungsten oxide, titanium oxides, (e.g., indium tin oxide), lithium titanium oxides of compositions $Li_xTiO_2$, $Li_4Ti_5O_{12}$, preferably with a potential within about 1V of the lithium potential, materials capable of alloying with lithium electrochemically wherein the material is electro-reduced such as metals and semi-metals (e.g., aluminum, silver, indium, tin, bismuth, lean, silicon, germanium, antimony and combinations thereof binary and ternary metal and/or semi-metal alloys and the like) metal alloys (e.g., antimony alloys including $Cu_2Sb$, CoSb, MnSb, InSb) and semi-metals (e.g., silicon), semi-metal alloys, and such metal alloy intermetallics and combinations thereof including composites such as composites including alloys (e.g., composite silicon alloys) such as carbon intercalation metal or semi-metal material composites (e.g., C—Si, C—Sn, Sn-M-C, Sb-M-C, Si-M-C, where M is a metal such as Ti, V, Cr, Mn, Fe and Co, especially Sn—Co—C and Sb—Cu—C, such as $Cu_2Sb$—C, and Si—Co—C), and others such as alloying metal or semi-metal alloys combined with C and/or $SiO_x$ to form such composites alloys.

In accordance with this aspect of the disclosure, the cell is constructed in the discharged state, and typically in the fully discharged state using for instance an aqueous catholyte having dissolved therein $Li_2S$. In preferred embodiments, to enhance the net capacity of the cell, solid phase $Li_2S$ may be incorporated on the cathode side of the cell out of contact with the anode electroactive material but in contact with the catholyte, and typically at least a portion of the $Li_2S$ in contact with the cathode; however, the disclosure is not meant to be limited as such and it is contemplated herein that the Li$_2$S may be loaded in a separator component disposed between the anode protective membrane architecture and the cathode, or disposed in a region of the cell removed from the electron transfer medium, the Li2S in a remote region nearby the cathode but not necessarily in contact with the electron transfer medium (e.g., not in contact with the electron transfer medium). In operation the instant cell is caused by a user or the cell manufacturer to undergo an initial charging step. During charge lithium intercalates into the anode (e.g., into the electroactive carbon) and active sulfur is electro-oxidized at the electron transfer medium.

In yet another embodiment rather than load the protected anode with an electroactive layer, lithium metal is plated onto a current collector disposed adjacent to the protective membrane architecture (e.g., a copper foil current collector). By this expedient, the entirety of the metal lithium is derived from the reduced lithium polysulfide species in the electrolyte and electro-reduced to form the lithium within the anode. By this expedient, the cell is assembled in a state wherein the protected anode is not only devoid of active lithium it is entirely devoid of an electroactive material prior to the initial charging operation. This embodiment is particularly advantageous as it provides a highly cost effective technique for effectively fabricating an aqueous lithium metal sulfur battery without having to supply lithium metal in foil or coated form on a current collector substrate because the entirety of the lithium metal is generated as a result of electrochemically charging the cell. In some embodiments it is preferable to have a thin wetting layer on the surface of the current collector (e.g., an aluminum layer) or a thin layer of lithium pre-deposited on the current collector (e.g., less than 20 micron layer) prior to cell assembly, the thin layer of lithium serving to provide a surface for facile electrochemical lithium deposition.

Flow Cell and Flow Cell System

Figure 6:
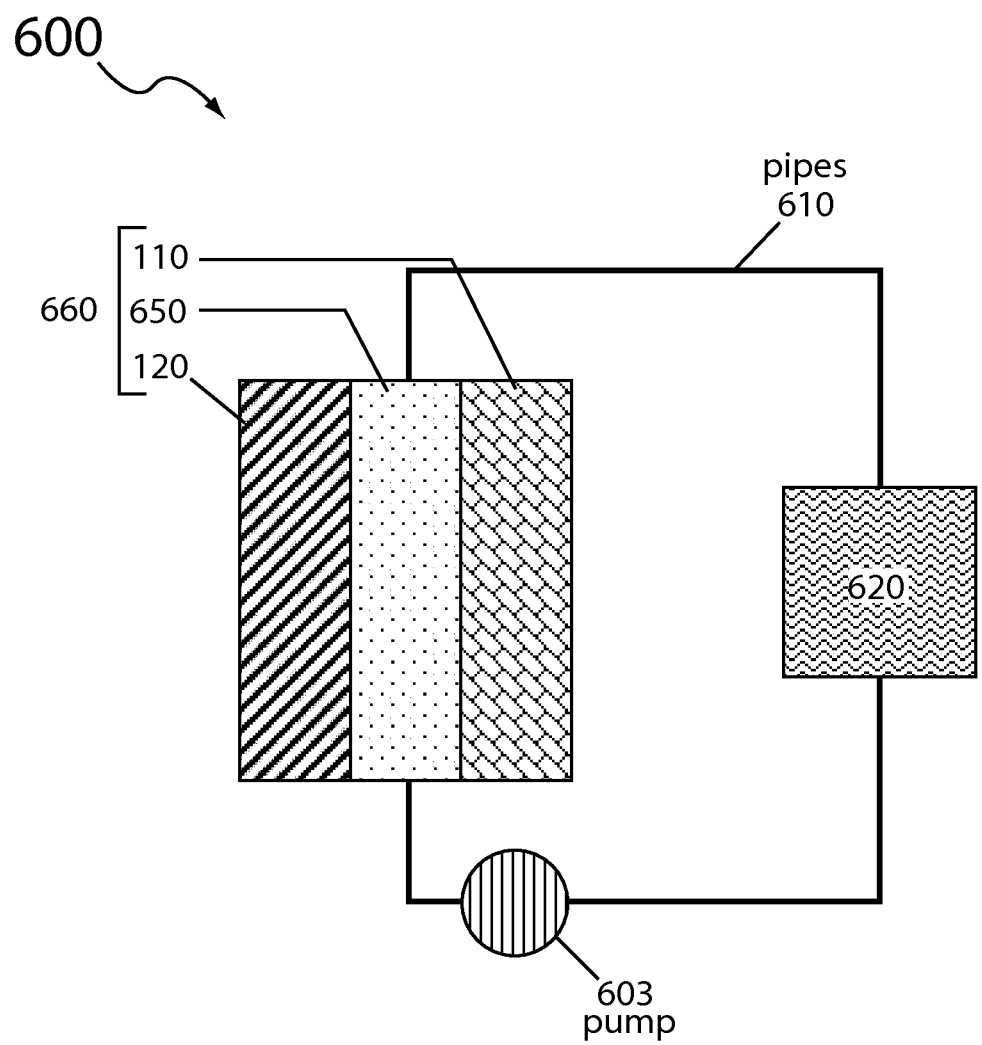
FIG. 6 is a schematic cross section of a battery flow cell system in accordance with an embodiment of the present disclosure.

With reference to FIG. 6 there is illustrated a representative embodiment of an aqueous lithium sulfur flow cell battery system 600 in accordance with this aspect of this disclosure. The system includes a reactor cell 660 in which there is positioned a lithium anode 120 and a sulfur cathode 110 configured, in one embodiment, in a spatially apart relationship, therewith defining an inter-electrode region 650 through which an aqueous sulfur catholyte is caused to flow during operation. In various embodiments the lithium anode is a protected lithium electrode as described above and the sulfur cathode likewise as described above. In a slightly modified embodiment the sulfur cathode, a porous three dimensional body, is positioned in direct contact with the first surface of the protected anode solid electrolyte membrane architecture (i.e., not in a spatially apart relationship) and the aqueous catholyte is caused to flow into the pores of the cathode structure.

Continuing with reference to FIG. 6 the system further comprises an external reservoir system, which may take the form of a storage tank 620 for storing the aqueous sulfur catholyte to be flowed through the inter-electrode region or channel. The reservoir system may also include pipeworks 610 for fluidly coupling the tank to the reactor, and a pump 603 for circulating the electrolyte through the channel. The pipeworks may have valves (not shown) for closing or opening the reactor cell to the storage tank. The pump may be operated for circulating the electrolyte through the channel, and the valves may be used to control the flow of catholyte through the reactor.

The aqueous catholyte provides the electroactive sulfur species, which are electrochemically reacted at the sulfur electrode during charge and discharge. In operation, the aqueous catholyte from the storage tank is caused to flow by and/or through the sulfur cathode, and dissolved polysulfide species are electro-reduced when the system is delivering electricity (during discharge) and electro-oxidized when storing electricity on charge.

Since the ampere-hour capacity of the cathode is provided by the aqueous catholyte in the storage tank, the sulfur cathode is typically assembled in the reactor cell devoid of elemental sulfur. For instance, the sulfur cathode may be a carbon matrix optionally coated with a catalyst to facilitate polysulfide redox while inhibiting hydrogen evolution. Moreover, during system assembly, while the lithium electroactive material of the anode may be incorporated in a fully charged state (e.g., in the form of a lithium metal foil), in preferred embodiments it is an intercalation material or alloy material that is incorporated in the fully discharged state (i.e., devoid of any active lithium). Carbon materials such as graphitic or synthetic carbons capable of reversibly intercalating lithium are a particularly suitable lithium electroactive material for use in the instant flow cell system. Others include lithium alloying materials, as described above, such as silicon and tin which are capable of reversibly absorbing/desorbing lithium electrochemically, as well as composite carbon silicon materials.

Held in the storage tank, the aqueous catholyte effectively provides the cathode fuel for the electrochemical reaction at the sulfur cathode, and the aqueous catholyte embodiments described above with reference to the battery cell embodiment illustrated in FIG. 1 are suitable for use herein as a cathode fuel. The aqueous catholyte fuel comprises polysulfide species dissolved in water. In embodiments the concentration of the dissolved polysulfide species in the aqueous electrolyte is in the range of 0.5 to 1 molar sulfur, 1 to 2 molar sulfur, 2 to 3 molar sulfur, 3 to 4 molar sulfur, 4 to 5 molar sulfur, 5 to 6 molar sulfur, 6 to 7 molar sulfur, 7 to 8 molar sulfur, 8 to 9 molar sulfur, 9 to 10 molar sulfur, and in some embodiments the concentration of polysulfide species is greater than 10 molar sulfur, greater than 11 molar, greater than 12 molar, greater than 13 molar, greater than 14 molar, greater than 15 molar, and greater than 16 molar. In other embodiments a catholyte of like sulfur concentration as that of the ranges listed immediately above is based on one or more alcohol solvents or comprises an alcohol solvent as an additional component of the aqueous catholyte. Particularly suitable such alcohols include those described above and especially methanol, ethanol, and glycols (list others here).

In one embodiment the system is assembled with the lithium electroactive material in the discharged state (e.g., carbon intercalation material devoid of intercalated lithium), and the aqueous catholyte comprising highly reduced polysulfide species, e.g., dissolved Li$_2$S. For example, the aqueous catholyte can be a solution of about 3 molar Li$_2$S dissolved in water, and is typically greater than 1 molar Li$_2$S. Aqueous sulfur catholyte storage tanks having enhanced sulfur capacity (i.e., greater sulfur capacity per unit volume) may be achieved by adding additional solid lithium sulfide to the catholyte beyond its solubility limit (i.e., a saturated water solution of Li$_2$S). Because of the fast kinetics of lithium sulfide dissolution in water, additional catholyte capacity may be added to the tank by dispersing or suspending solid phase lithium sulfide in the aqueous catholyte.

Continuing with reference to the above embodiment, the system is assembled in the fully discharged state so it must undergo an initial charge reaction to lithiate the carbon intercalation material. The initial charge may be conducted via electro-oxidation of the reduced aqueous catholyte (e.g., 3 molar Li$_2$S water solution) or a conditioning catholyte formulation comprising lithium may be used, for instance one in which sulfur is not the electroactive species. For example, the initial charge may be completed by using a water based lithium nitrate catholyte solution that is circulated or caused to flow past the cathode, whereupon the water is electro-oxidized and oxygen evolved, while at the anode lithium ions from the conditioning catholyte electro-reductively intercalate into the carbon. The conditioning catholyte flowing through the channel may be electro-oxidized until the reaction is complete and the carbon is sufficiently or fully lithiated. Thereafter, the conditioning catholyte tank is replaced by a tank of aqueous sulfur catholyte.

In embodiments wherein the lithium electroactive material is fully or mostly charged via the lithiation step described above (e.g., by using a conditioning catholyte), the aqueous catholyte may then be formulated in an oxidative or highly oxidative state; for instance, as elemental sulfur dispersed or suspended in a water solution typically also comprising a dissolved lithium salt (e.g., lithium hydroxide) to support the ionic current. It is contemplated that solvents capable of dissolving elemental sulfur such as toluene may be added to the catholyte in order to dissolve some of the dispersed solid sulfur and by this expedient facilitate electro-reduction at the sulfur cathode.

Various compositions of the as formulated catholyte storage tanks are contemplated. In various embodiments the flow cell is operated such that the active stoichiometric lithium sulfur ratio is Li$_2$S$_x$ with (1<x<5), (x=5), or (x>5), with a sulfur concentration in the range of 1 to 16 molar.

In the aforementioned flow cell embodiments, the lithium electroactive material is stationary, which is to mean that it is non-flowing and incorporated as a component of the protected lithium electrode, e.g., typically in the form of a layer such as a sintered layer or a coating on a current collector as is well known in the field of lithium ion batteries. Thus, the capacity of the anode is set once the coating is formed and the system is assembled.

Figure 7:
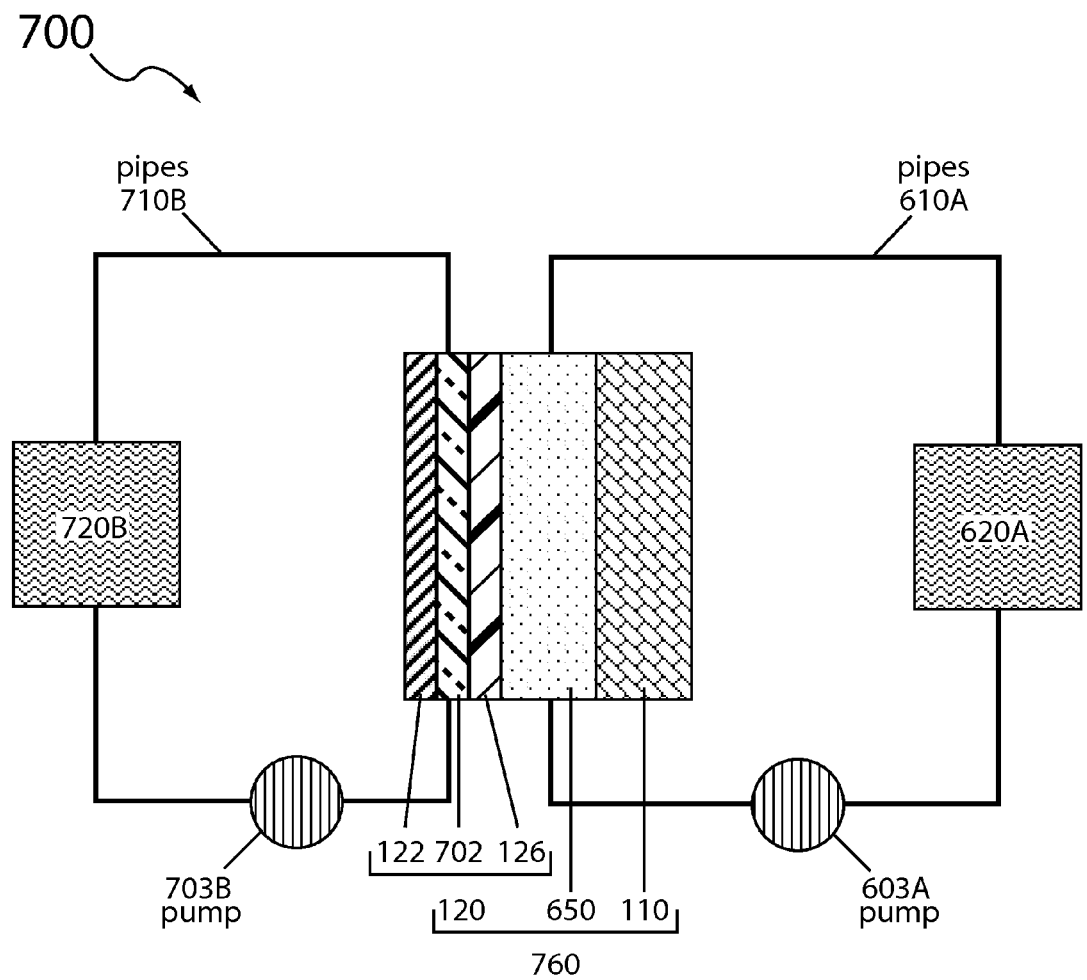
FIG. 7 is a schematic cross section of a battery flow cell system in accordance with an alternative embodiment of the present disclosure.

In an alternative embodiment, with reference to the flow cell system 700 illustrated in FIG. 7, the structure of FIG. 6 is supplemented by a reactor cell 760 configured for through flow of a flowable lithium electroactive material (e.g., an electroactive lithium slurry) between an anode current collector 122 on which the electrochemical reactions take place and the second surface of a substantially impervious lithium ion conducting membrane architecture 126. Flowable lithium electroactive materials suitable for use herein are described in US Patent Application Pub. Nos.: 2011/0200848 of Chiang et al., published Aug. 18, 2011 and 2010/0323264 of Chiang et al., published Dec. 23, 2011, and each of these is hereby incorporated by reference for all that they contain in this regard. Generally these are anode particles dispersed in an ionically conductive carrier fluid that is compatible with the anode particles over the range of oxidation state encompassing full charge to full discharge. Particularly suitable anode particulates are intercalation carbons or alloy materials such as silicon, or a combination of these (e.g., carbon-silicon composite). The anode current collector 122 is disposed in the cell in spaced relation to the protective membrane architecture, thus defining a channel 702 through which the lithium electroactive slurry is caused to flow, for instance via pumping action. The flow system includes a second external reservoir system for the lithium anode, which may take the form of a storage tank 720B for storing the lithium anode slurry and pipeworks 710B for fluidly coupling the tank to the reactor cell, and a pump 703B for circulating the slurry through the channel, similar to that which is described above for circulating the sulfur catholyte.

CONCLUSION

Various embodiments have been described in this disclosure. However a person of ordinary skill in the art will recognize that various modifications may be made to the described embodiments without departing from the scope of the claims. Accordingly, the present embodiments are to be considered as illustrative and not restrictive, and the claimed invention is not to be limited to the details given herein.

What is claimed is:

1. An aqueous sulfur battery cell, comprising:
   an anode structure comprising a lithium electroactive material;
   a cathode comprising a solid electron transfer medium;
   an aqueous electrolyte solution comprising an aqueous solvent system and electroactive sulfur species dissolved therein, the aqueous solvent system comprising water solvent for maintaining electroactive sulfur species in solution during cell discharge and a cycle life enhancing compound, that facilitates charging at the cathode;
   wherein the aqueous electrolyte solution is in electron transfer contact with the cathode but isolated from direct contact with the lithium electroactive material.

2. The aqueous lithium sulfur battery cell of claim 1, wherein the water serves as a reactive solvent for maintaining electroactive sulfur species in solution during cell discharge.

3. The aqueous lithium sulfur battery cell of claim 1, wherein the aqueous electrolyte solution has an active stoichiometric ratio represented by the chemical formula Li$_2$S$_x$, with x having a value between 1 and 7.

4. The aqueous lithium sulfur battery cell of claim 3, wherein the cycle life enhancing compound is present in an amount sufficient to support an aqueous electrolyte solution having an active stoichiometric ratio represented by the chemical formula Li$_2$S$_x$, wherein x is greater than 5.

5. The aqueous lithium sulfur battery cell of claim 1, wherein the cycle life enhancing compound is an organic compound.

6. The aqueous lithium sulfur battery cell of claim 5, wherein the organic compound is a protic nitrogen containing organic compound.

7. The aqueous lithium sulfur battery cell of claim 5, wherein the organic compound is a primary amine.

8. The aqueous lithium sulfur battery cell of claim 5, wherein the organic compound is a secondary amine.

9. The aqueous lithium sulfur battery cell of claim 5, wherein the organic compound is a tertiary amine.

10. The aqueous lithium sulfur battery cell of claim 5, wherein the organic compound is represented by the general formula:

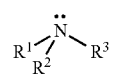

wherein R$^1$ is H or an organic radical (i.e., functional group), R$^2$ is H or an organic radical, and R$^3$ is H or an organic radical.

11. The aqueous lithium sulfur battery cell of claim 1, wherein the cycle life enhancing compound is ammonia.

12. The aqueous lithium sulfur battery cell of claim 11, wherein the amount of ammonia in the aqueous solvent is greater than 5% (m/m).

13. The aqueous lithium sulfur battery cell of claim 11, wherein the amount of ammonia in the aqueous solvent is between 5 to 35% (m/m).

14. The aqueous lithium sulfur battery cell of claim 11, wherein the amount of ammonia in the aqueous solvent is between 14 to 33% (m/m).

15. The aqueous lithium sulfur battery cell of claim 11, wherein the pH of the electrolyte absent the ammonia is greater than 12.

16. The aqueous lithium sulfur battery cell of claim 1, wherein the volume percent of water in the aqueous solvent system is at least 10%.

17. The aqueous lithium sulfur battery cell of claim 1, wherein the cell is a secondary battery.

18. The aqueous lithium sulfur battery cell of claim 5, wherein the amount of said organic compound dissolved in the electrolyte is sufficient to yield a cell whereby the total capacity is provided by dissolved active sulfur species, and the delivered capacity of said dissolved sulfur species corresponds to a value that is greater than 700 mAh/gram of dissolved sulfur over at least 2 cycles.

19. The aqueous lithium sulfur battery cell of claim 1, wherein the aqueous solvent system provides a medium for twofold solvolysis of electroactive sulfur species, a firstfold solvolysis taking place during discharge and a secondfold solvolysis taking place during charge, the water serving to solubilze, via hydrolysis, active sulfur species on discharge and the cycle life enhancing compound serving as a reactive solvent for solubilizing electroactive sulfur species on charge.

20. The aqueous lithium sulfur battery cell of claim 19, wherein the aqueous electrolyte solution has an active stoichiometric ratio of greater than 5.

* * * * *